(12) United States Patent
Kim et al.

(10) Patent No.: US 6,532,139 B2
(45) Date of Patent: Mar. 11, 2003

(54) ARC FAULT CIRCUIT INTERRUPTER AND CIRCUIT BREAKER HAVING THE SAME

(75) Inventors: Cheon-Youn Kim, Incheon (KR); Jeong-Wan Kim, Bucheon-si (KR)

(73) Assignee: Human El-Tech, Inc., Gyeonggi-do (KR)

(*) Notice: Subject to any disclaimer, the term of this patent is extended or adjusted under 35 U.S.C. 154(b) by 0 days.

(21) Appl. No.: 09/852,117

(22) Filed: May 10, 2001

(65) Prior Publication Data

US 2002/0008950 A1 Jan. 24, 2002

(30) Foreign Application Priority Data

May 12, 2000 (KR) ................................. 00-25385
Apr. 25, 2001 (KR) ................................. 01-22392

(51) Int. Cl.[7] ................................................ H02H 3/00
(52) U.S. Cl. ........................... 361/42; 361/93.1; 361/78
(58) Field of Search ............................. 361/42, 45, 78, 361/71, 93.1, 93.2

(56) References Cited

U.S. PATENT DOCUMENTS

| | | |
|---|---|---|
| 5,224,006 A | 6/1993 | MacKenzie et al. |
| 5,805,397 A | 9/1998 | MacKenzie |
| 5,886,861 A | 3/1999 | Parry |
| 5,896,262 A * | 4/1999 | Rae et al. ...................... 361/42 |
| 5,933,305 A | 8/1999 | Schmalz et al. |
| 5,963,406 A | 10/1999 | Neiger et al. |
| 5,973,896 A | 10/1999 | Hirsh et al. |
| 5,982,593 A | 11/1999 | Kimblin et al. |
| 5,999,384 A * | 12/1999 | Chen et al. .................. 361/106 |
| 6,049,143 A * | 4/2000 | Simpson et al. ............ 307/126 |
| 6,057,997 A | 5/2000 | MacKenzie et al. |
| 6,128,168 A | 10/2000 | Arnold et al. |

* cited by examiner

*Primary Examiner*—Kim Huynh
(74) *Attorney, Agent, or Firm*—Rabin & Berdo, P.C.

(57) ABSTRACT

A circuit breaker for shutting off an AC electrical source from a phase wire and a neutral wire has the ability to detect an arc fault, ground fault and overload. The circuit breaker includes an arc fault circuit interrupter (AFCI), a ground fault circuit interrupter (GFCI), an overload circuit interrupter (OLCI), and trip circuitry. The AFCI, the GFCI and the OLCI are crossed between the phase wire and the neutral wire of the AC power line and detect the arc fault, ground fault and overload respectively. The trip circuitry is used for shutting off the AC source from the circuit breaker when at least one of the arc fault, ground fault and overload occurs. The circuit breaker is shut when the level of at least one of an arc fault trip signal, ground fault trip signal and overload trip signal is larger than a specified reference trip level.

14 Claims, 21 Drawing Sheets

ARC FAULT CIRCUIT INTERRUPTER AND CIRCUIT BREAKER HAVING THE SAME

FIELD OF THE INVENTION

The present invention relates to a power distribution system, and more particularly, to a circuit breaker for triggering operation of the power distribution system when at least one of an arc fault, a ground fault or an overload is detected in the system.

BACKGROUND OF THE INVENTION

Low voltage networks, typically 600 volts and below, are used to distribute electric power in a specified area, such as part of a city, an industrial or a commercial area. Often, the cables in such networks are located underground. Typically, the network is designed to feed at more than one point, and therefore, has multiple sources. Occasionally, the cables fail due to various causes such as thermal degradation, age, moisture or rodent damage. The networks are protected by circuit breakers. However, in order to isolate the faulty cable and therefore to minimize disruption of the networks, cable limiters are provided at the ends of the cables. Cable limiters are fuse-like devices that only react safely to high voltage and low impedance faults, such as those created by phase-to-phase faults.

Wiring (miniature) circuit interrupters and current leakage circuit interrupters are commonly used devices for protecting people and property from fire and dangerous electrical faults. Wiring circuit interrupters are used to protect power lines. First, when excessive current passing through a circuit breaker is converted to heat, the circuit interrupter is tripped by the bending of an internal bimetal. Second, when an electric tool or other metallic object on the load shorts the power line, high current is passed through instantaneously, causing the bimetal to heat up and bend. This causes the electric device to be interrupted by the inner magnet of the circuit interrupter.

It is known in this field that the current leakage circuit interrupter has the ability to detect current leakage that may be present in the power line. It trips the circuit interrupter and so protects people from electric shock resulting from current leakage.

In America, according to current regulations, a ground fault circuit interrupter (GFCI) is presently used in applications where direct human contact is possible. The GFCI, which is able to detect current leakage with high sensitivity, is used in current leakage circuit interrupters. Thus, a GFCI must be installed in all kitchens, bathrooms, parking places, basements or other damp places.

In spite of the wiring circuit interrupter and current leakage circuit interrupter, many electrical fires occur all over the world every year. These are often occurred by an arcing type fault to ground occurs rather than a phase-to-phase fault. Arcing faults typically create root mean square (RMS) current value, which is below the thermal threshold for such circuit breakers. Even so, the arcs can cause damage or start a fire if they occur near combustible material.

Arcs are potentially dangerous due to their high temperatures. An arc, however, will only trip a GFCI if it produces sufficient current leakage to ground. In addition, an arc will trip a circuit breaker only if the current, flowing through the arc, exceeds the trip parameters of the thermal/magnetic mechanism of the circuit breaker. Therefore, an additional type of protection device is needed to detect and interrupt arcs that do not fit these criteria. An arc detector whose output is used to trigger a circuit interrupting mechanism is referred to as an arc fault circuit interrupter (AFCI).

According to the Consumer Product Safety Commission (CPSC), it was estimated that 40% of the fires in 1997 were due to arc faults. The National Electric Code (NEC) requires AFCI installation in all the residential buildings beginning in January 2002. The causes of arcing are numerous. For example, it may be caused by: aged or worn insulation and wiring; mechanical and electrical stress caused by overuse, excessive currents or lightning strikes; loose connection; or excessive mechanical damage to insulation and wires.

Three types of arcing may occur in residential or commercial buildings: series arcing, parallel arcing and ground arcing.

Series (or contact) arcing occurs between two contacts in series with a load. An example of series arcing is illustrated in FIG. 1. The conductors 14, 16 comprising the cable 10, are separated and surrounded by an insulator 12. A portion of the conductor 14 is broken, creating a series gap 18 in the conductor 14. Under certain conditions, arcing will occur across this gap, producing a large amount of localized heat. The heat produced by the arcing might be sufficient to break down and carbonize the insulation 19 close to the point of arcing. If the arc is allowed to continue, enough heat will be generated to start a fire. Under these conditions, current flowing through the arc is controlled by load.

A schematic diagram illustrating an example of parallel (line) arcing is shown in FIG. 2. The cable 20 comprises electrical conductors 24, 26 covered by outer insulation 22 and separated by inner insulation 28. Deterioration or damage to the inner insulation 28 at 21 may cause parallel fault arcing 23 to occur between the two conductors 24, 26. The inner insulation could have been carbonized by an earlier lightning strike to the wiring system, or it could have been cut by some mechanical action such as a metal chair leg cutting into an extension cord.

A schematic diagram illustrating an example of ground arcing occurring between a conductor and the ground is shown in FIG. 3. If the outer insulation 38 for protecting conductors 34, 36 is damaged, the conductor 36 contacting ground at the damaged portion 39 produces ground arcing.

The arcing current may be changed by impedance because parallel arcing and ground arcing occur parallel to the load. The long-term deterioration causes cable carbonization and damage to the coating. The cable is further deteriorated by Joule heat, which is induced by arcing current. The arcing is generated in the following manner: J (Joule heat)=$I^2$ (arcing current)×t (Time).

An example of static current and arcing current in the resistor load are illustrated in FIG. 4. The arcing current 42 is not normal sine wave but is distorted at the phase changing point. According to the distortion of arcing current, arcing voltage is also distorted. FIG. 5 shows the relation between arcing current and arcing voltage.

An example of distorted AC line voltage caused by arcing current is illustrated in FIG. 6. The Joule heat is increased against the decrease of RMS AC line voltage value 61 caused by irregular arcing current 62. An arc is superposed on the AC line voltage. The frequency of harmonic or overtone is extended to GHz, and it can be seen by spectrum analysis of the frequency of arcing current.

The major problem associated with any type of arc detection is false tripping. False tripping occurs when an arc detector produces a warning output, or disconnects a section of wiring from the voltage source, when a dangerous arcing condition does not actually exist. This problem is caused by the fact that arcing current and arcing voltage are not generated in the form of correct sine wave, and have various types of waveforms. Specifically, arcing current and arcing voltage are similar to the driving pulse created in appliances, such as fans and dryers that have electric motors inside.

FIG. 7 illustrates the signals related to output voltage in the resistor load, and FIG. 8 illustrates the output voltage with arcing. And, FIG. 9 illustrates output voltage waveform in a driving electric device.

The signals in FIG. 7 show that under a normal load, the output voltage is generated to pulse every 1/60 sec. The signals in FIG. 8 show that under arcing conditions, arcing voltage with high amplitude is detected every 1/60 sec. Also, if you use an electric device, you can see that at the beginning of a cycle, high pulse similar to the arcing voltage is generated, and after a period of time, output voltage will have the normal amplitude (See FIG. 9). Therefore, it is difficult to detect arcing because arcing voltage is similar to a driving pulse at the beginning of a cycle.

The arc fault detector (AFD) in U.S. Pat. No. 5,805,397 discloses the method of detecting arcing by multiple channel sensing. The prior patent uses a method of detecting arcing in several bandwidths, and the AFD trips the circuit under conditions of arcing generation in any bandwidths.

A schematic diagram in block form of this prior art is shown in FIG. 10. The electrical system 100 protected by the circuit breaker 103 includes a line conductor 105 and a neutral conductor 107 connected to provide power to a load 109. The circuit breaker 103 includes separable contacts 111 which can be tripped open by a spring operated trip mechanism 101. The trip mechanism 101 may be activated by a conventional thermal-magnetic over-current device 116. This thermal-magnetic over-current device 116 includes a bimetal 115 connected in series with the line conductor 105. Persistent over-currents heat up the bimetal 115 causing it to bend and release a latch 113, which activates the trip mechanism 101. Alternatively, short circuit currents through the bimetal 115 magnetically attract an armature 114, which releases the latch 113 to activate the trip mechanism 101.

A schematic diagram of a prior art arc fault detection circuit is shown in FIG. 11. The arcing fault detector 120 is a multi-channel bandpass filter circuit 126 including two channels 123, 124. Each channel 123, 124 includes a bandpass filter 125 and 126. Each bandpass filter 125 and 126 has an assigned, distinct non-overlapping passband. Thus each of the bandpass filters 125, and 126 will generate an output signal in response to an arcing fault. Therefore, the circuit breaker is tripped when the accumulated output signal from the filter reaches a specified level.

A block diagram illustrating an arc fault/ground fault circuit interrupter (AFCI/GFCI) device of the prior art is shown in FIG. 12. The prior AFCI generates an output signal comparing the first arc detecting signal in the line with the second arc detecting signal in the load. The AFCI/GFCI device 180 comprises AFCI/GFCI circuitry 182, line circuitry 188, load circuitry 200, arc detection circuitry 198, local/remote inhibit circuitry 184, and timer circuitry 186.

And, FIG. 13 shows a schematic diagram illustrating the AFCI/GFCI circuitry portion of the prior art arc fault detection device in more detail.

The prior art AFCI/GFCI device may control electric circuit processing independently in response to arcing generation, with the result of comparing line arcing and load arcing at each line circuitry 188 and load circuitry 200. However, the prior art needs amplifier, filter, rectifier and peak detector at each line and load circuitry, so it costs more. Furthermore, it is difficult to install an AFCI/GFCI device in a house because of its added size. Also, under the various real-life conditions, the prior arts cannot detect an arcing fault. Therefore, they are not effective for prevention of electrical fires in residential or commercial buildings.

SUMMARY OF THE INVENTION

The arc fault circuit interrupter (AFCI) of the present invention can effectively detect arc faults generated in electrical systems, and so protect people and their property from electrical fires.

The AFCI of the present invention can operate in combination with a ground fault circuit interrupter (GFCI) or overload circuit interrupter (OLCI). Thus, the circuit breaker with AFCI, GFCI and OLCI of the present invention can be provided to detect arc faults, ground faults and overloads effectively.

Also, the circuit breaker uses a simple construction and fewer elements. Therefore, it is less expensive and less time-consuming to construct circuit breaker, and can easily be installed in residential and commercial buildings.

To achieve the above-mentioned objects of the present invention, it is provided an arc fault circuit interrupter (AFCI) device in an electrical wiring system that can shut an AC (Alternating Current) source off from a phase conductor and a neutral conductor when an arc fault occurs in the AC source. The arc fault circuit interrupter device may comprise a current transformer for producing an arc voltage in accordance with the variation of current in the phase conductor and in the neutral conductor, an arc fault detector for limiting the arc voltage to a specified level and producing an arc fault indicative signal when the arc voltage is higher than a predetermined level, a trip signal generator for charging the arc fault indicative signal, and if the charged arc fault indicative signal corresponds to a reference trip level, then producing a trip signal, and a trip circuitry coupled between the phase conductor and the neutral conductor, for shutting the AC source off from the phase conductor and the neutral conductor in response to the trip signal.

The arc fault detector may comprise a filter for diminishing a harmonic frequency (i.e., overtone) component from the arc voltage and limiting the arc voltage to a specified level and a comparator for comparing the limited arc voltage with a reference arc signal and producing the arc fault indicative signal based upon the result of comparison. The filter may comprise a level limiter for limiting the arc voltage to the specified level and a rectifier for half or full wave rectifying the limited arc voltage. The level limiter may comprise at least one resistor coupled to the current transformer. The rectifier may comprise a first plurality of diodes coupled between the resistor of said level limiter and ground and a second plurality of diodes coupled between the resistor of said level limiter and said comparator. The comparator may comprise at least one operational amplifier. The comparator may further comprise a reference arc signal generator.

The trip signal generator may comprise a voltage divider for dividing the arc fault indicative signal, a comparator for comparing the divided arc fault indicative signal with the reference trip level and providing a first state output signal when the divided arc fault indicative signal is higher than the reference trip level, a first switch for controlling electrical power being provided to the comparator and a trip level controller for providing the trip signal according to the first state output signal.

The first switch may comprise a common emitter amplifier. The trip level controller may comprise a resistor coupled to output terminal of said comparator and a capacitor in parallel with the resistor. The resistor may be a variable resistor. The trip signal generator may further comprise a second switch coupled between said comparator and said trip level controller, for transferring the first state output signal to said trip level controller. The second switch may comprise an emitter follower.

Also, to achieve the above-mentioned objects of the present invention, it is provided a circuit breaker device in an electrical wiring system that can shut an AC (Alternating Current) source off from a phase conductor and a neutral conductor when at least one of an arc fault, ground fault or overload occurs in the AC source.

The circuit breaker may comprises an arc fault circuit interrupter (AFCI) coupled to the phase conductor and the neutral conductor for detecting an arc fault and producing an arc fault trip signal, a ground fault circuit interrupter (GFCI) coupled to the phase conductor and the neutral conductor for detecting ground fault and producing a ground fault trip signal, an overload circuit interrupter (OLCI) coupled to the phase conductor and the neutral conductor for detecting an overload and producing an overload trip signal, a display circuitry for indicating the arc fault, ground fault or overload respectively corresponding with at least one selected from the group consisting of the arc fault trip signal, the ground fault trip signal and the overload trip signal and a trip circuitry coupled to the phase conductor and the neutral conductor, for shutting the AC source off from the phase conductor and the neutral conductor corresponding with at least one selected from the group consisting of the arc fault trip signal, the ground fault trip signal and the overload trip signal. Wherein the arc fault circuit interrupter may comprise a current transformer for producing an arc voltage in accordance with variation of current in the phase conductor and the neutral conductor, an arc fault detector for limiting the arc voltage to a specified level and producing an arc fault indicative signal when the arc voltage is higher than a predetermined level and a trip signal generator for charging the arc fault indicative signal, and if the charged arc fault indicative signal corresponds to a reference trip level, then producing the arc fault trip signal.

The ground fault circuit interrupter (GFCI) may comprise a current detector for detecting current variation in the phase conductor and in the neutral conductor, and converting the current variation to a ground fault voltage, a filter for limiting the ground fault voltage to the specified range, a comparator for comparing the range limited ground fault voltage with a reference voltage, and producing a ground fault indicative signal in accordance with the result of comparison and a delay circuitry for producing the ground fault trip signal when the ground fault indicative signal is not less than a ground fault trip level. The filter further may comprise a power supply for diminishing noise from power and providing noise-free power. The delay circuitry may comprise a resistor and a capacitor in parallel with the resistor.

The overload circuit interrupter may comprise an overload detector coupled to the phase conductor and the neutral conductor for detecting the overload and producing an overload indicative signal and an overload trip signal generator for providing the overload trip signal in accordance with the overload indicative signal when the overload occurs. The overload detector may comprise at least one bimetal. The overload trip signal generator comprises metal oxide varistor.

The trip circuitry may comprise a power interrupter for shutting the AC source off from the phase conductor and the neutral conductor if an arc fault, the ground fault or overload occurs and a trip controller for controlling said power interrupter corresponding with at least one selected from the group consisting of the arc fault trip signal, the ground fault trip signal and the overload trip signal. The power interrupter may comprise a pulse generator for providing a magnetic pulse as a result of a fault in a current and a switch circuit for interrupting the AC source by means of the magnetic pulse. The pulse generator may be a solenoid. The trip controller may comprise a silicon controlled rectifier (SCR) and at least one diode for directing path of the current flow in said trip circuitry in accordance with generation of the magnetic pulse. The trip controller further may comprise a pressure controller. The pressure controller may comprise a first node coupled to the at least one diode of the trip controller and the varistor, a second node coupled to the phase wire and a third node coupled to the first node, wherein, the first node is connected to the second node or third node in accordance with an operation of said switch circuit.

The display circuitry may comprise a plurality of display elements for indicating at least one selected from the group consisting of the arc fault, the ground fault and the overload, a display controller for controlling the operation of said display elements and a power supply for providing power to said display elements. The display elements may comprise at least one light emitting diode. The display controller may comprise a transistor connected between both ends of said display elements.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Hereinafter, the preferred embodiments of the present invention will be explained in more detail with reference to the accompanying drawings.

Figure 1:
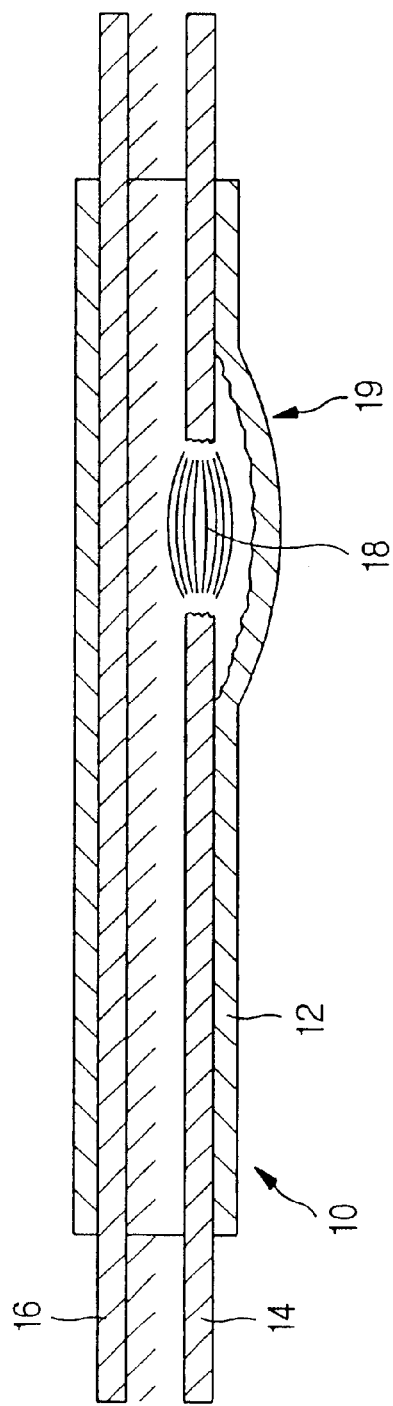
FIG. 1 is a schematic diagram illustrating an example of serial arcing in a current carrying conductor.
Figure 2:
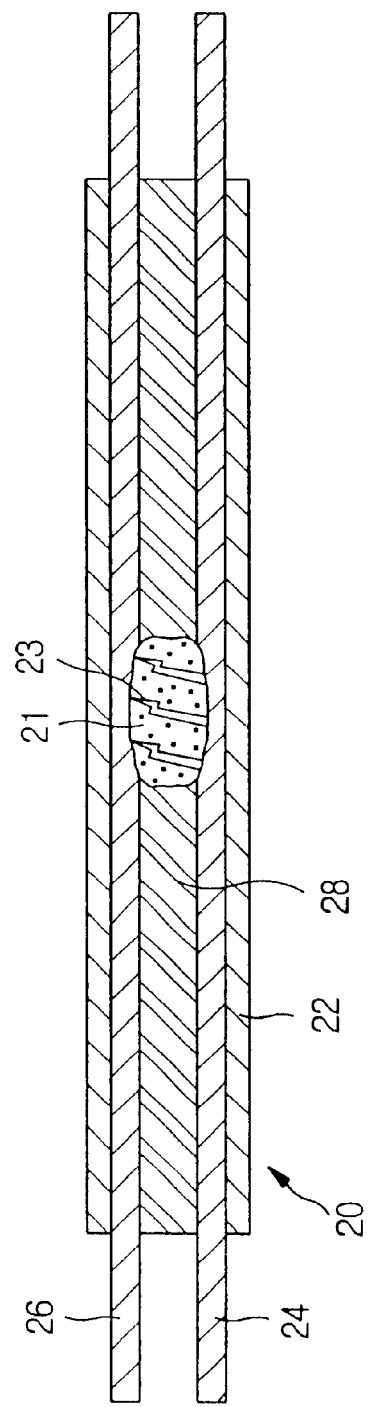
FIG. 2 is a schematic diagram illustrating an example of parallel arcing between two current carrying conductors.
Figure 3:
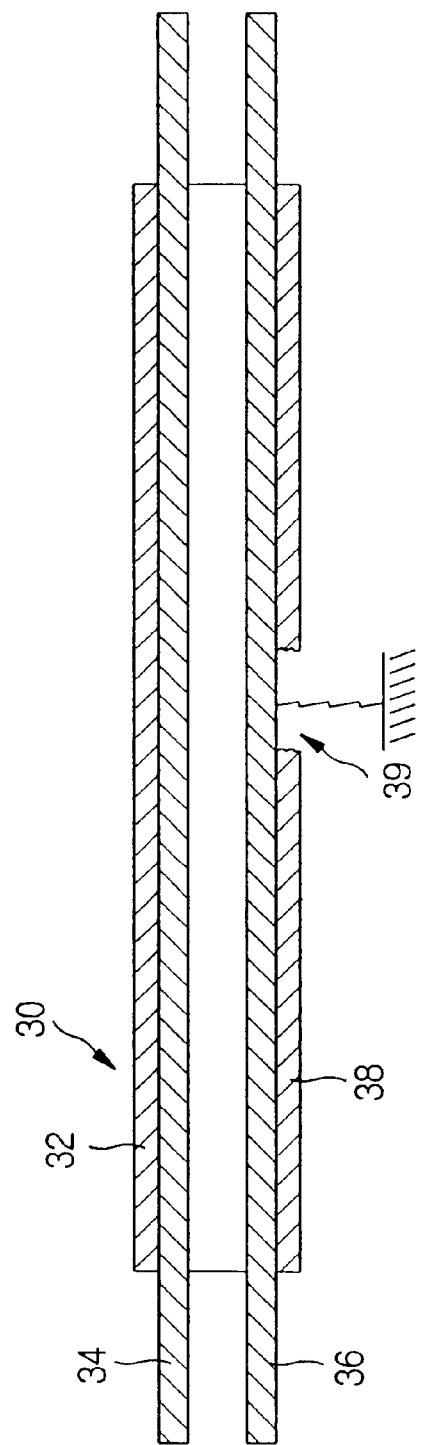
FIG. 3 is a schematic diagram illustrating an example of ground arcing between the current carrying conductor and the ground.
Figure 4:
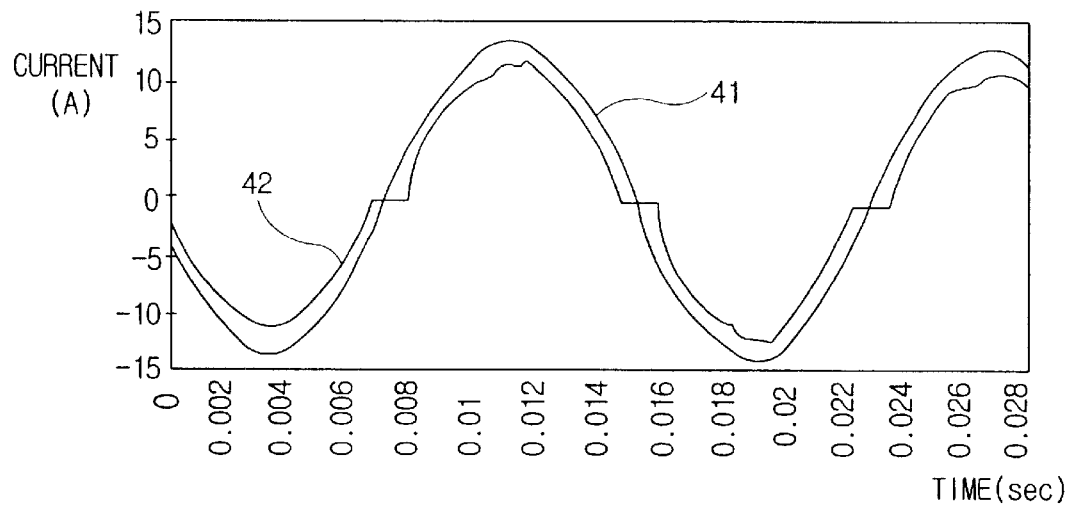
FIG. 4 is a graph illustrating an example of static current and arcing current in the resistor load.
Figure 5:
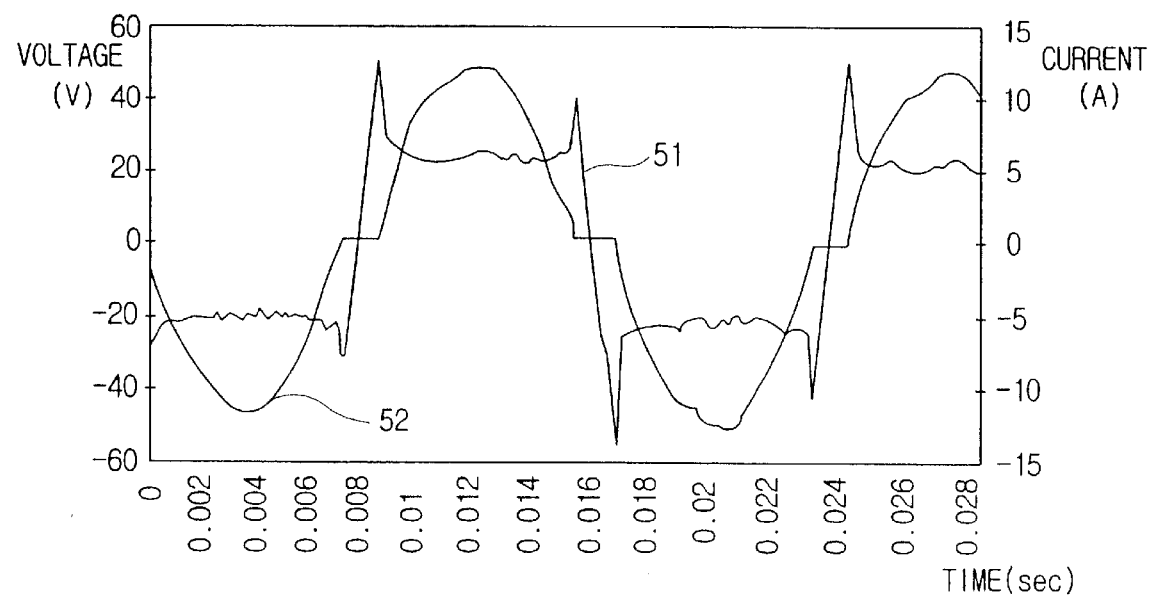
FIG. 5 is a graph illustrating an example of the relation between arcing current and arcing voltage.
Figure 6:
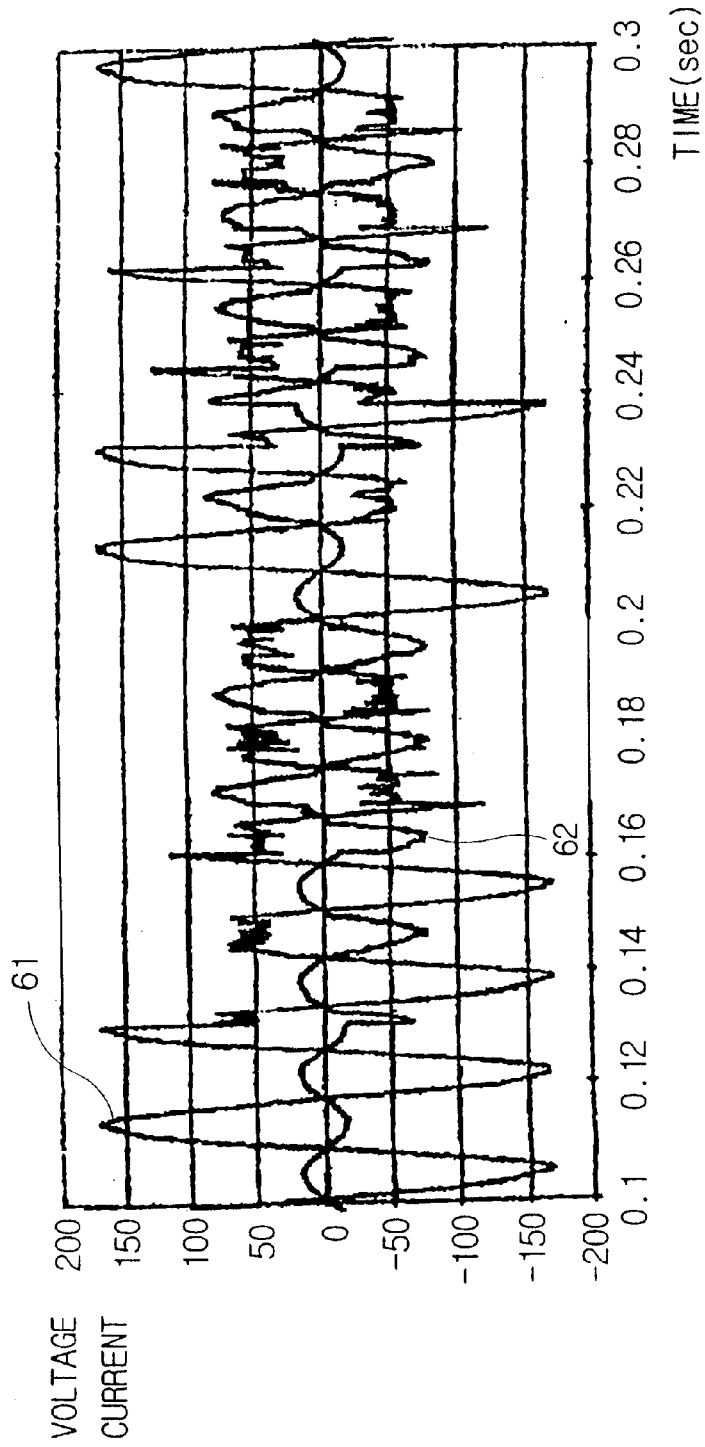
FIG. 6 is a graph illustrating an example of distorted AC line voltage caused by arcing current.
Figure 7:
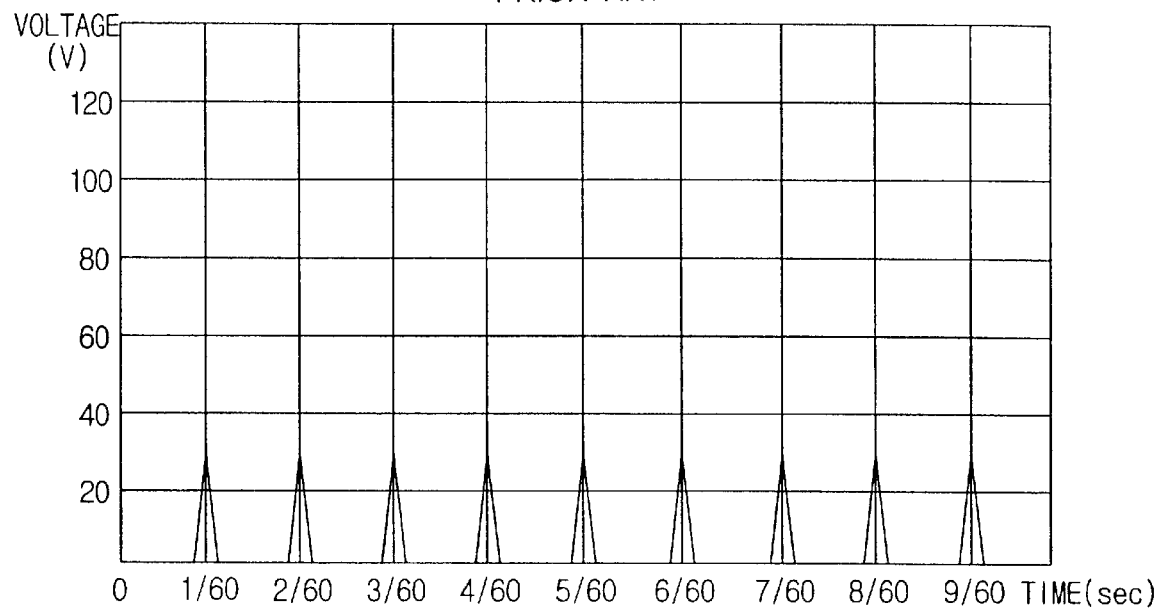
FIG. 7 is a graph illustrating an example of signals related to output voltage in the resistor load.
Figure 8:
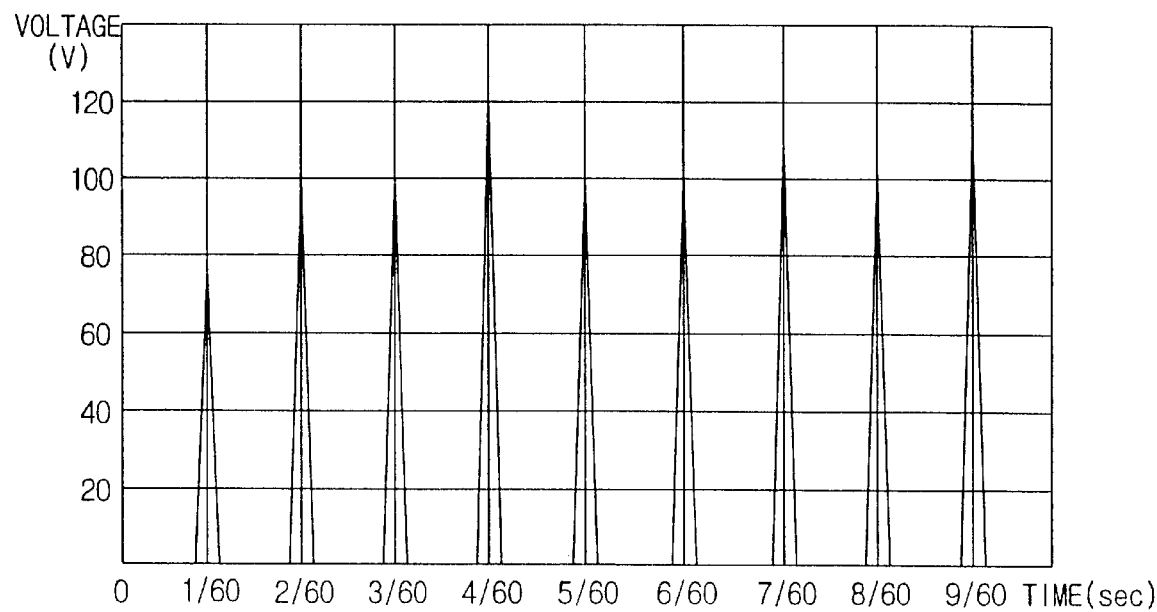
FIG. 8 is a graph illustrating an example of output voltage with arcing.
Figure 9:
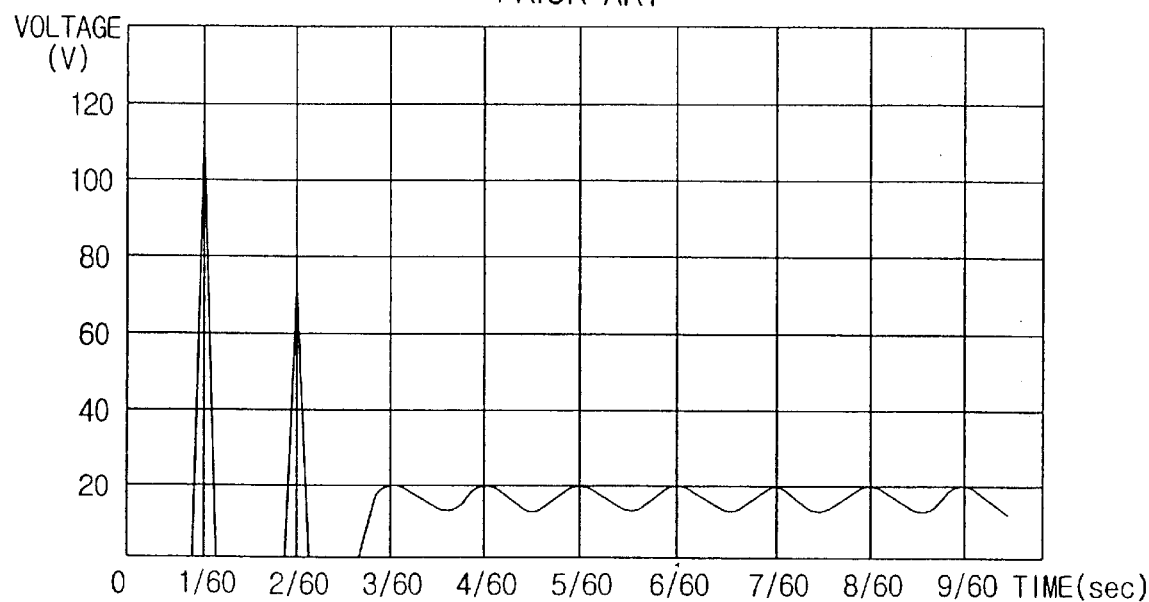
FIG. 9 is a graph illustrating an example of output voltage waveform in a driving electric device.
Figure 10:
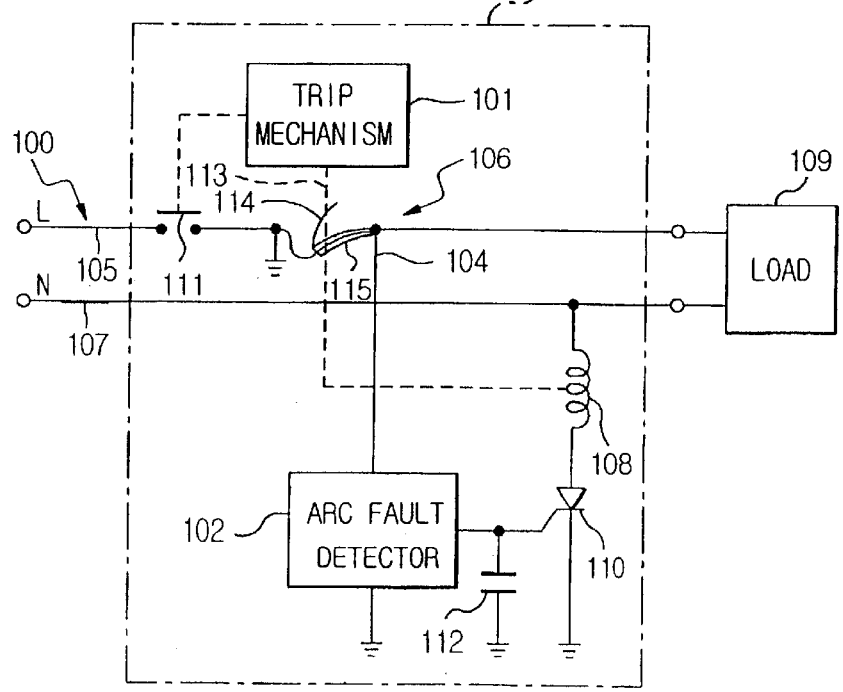
FIG. 10 is a schematic diagram in block form illustrating an example of the prior art arc fault detector.
Figure 11:
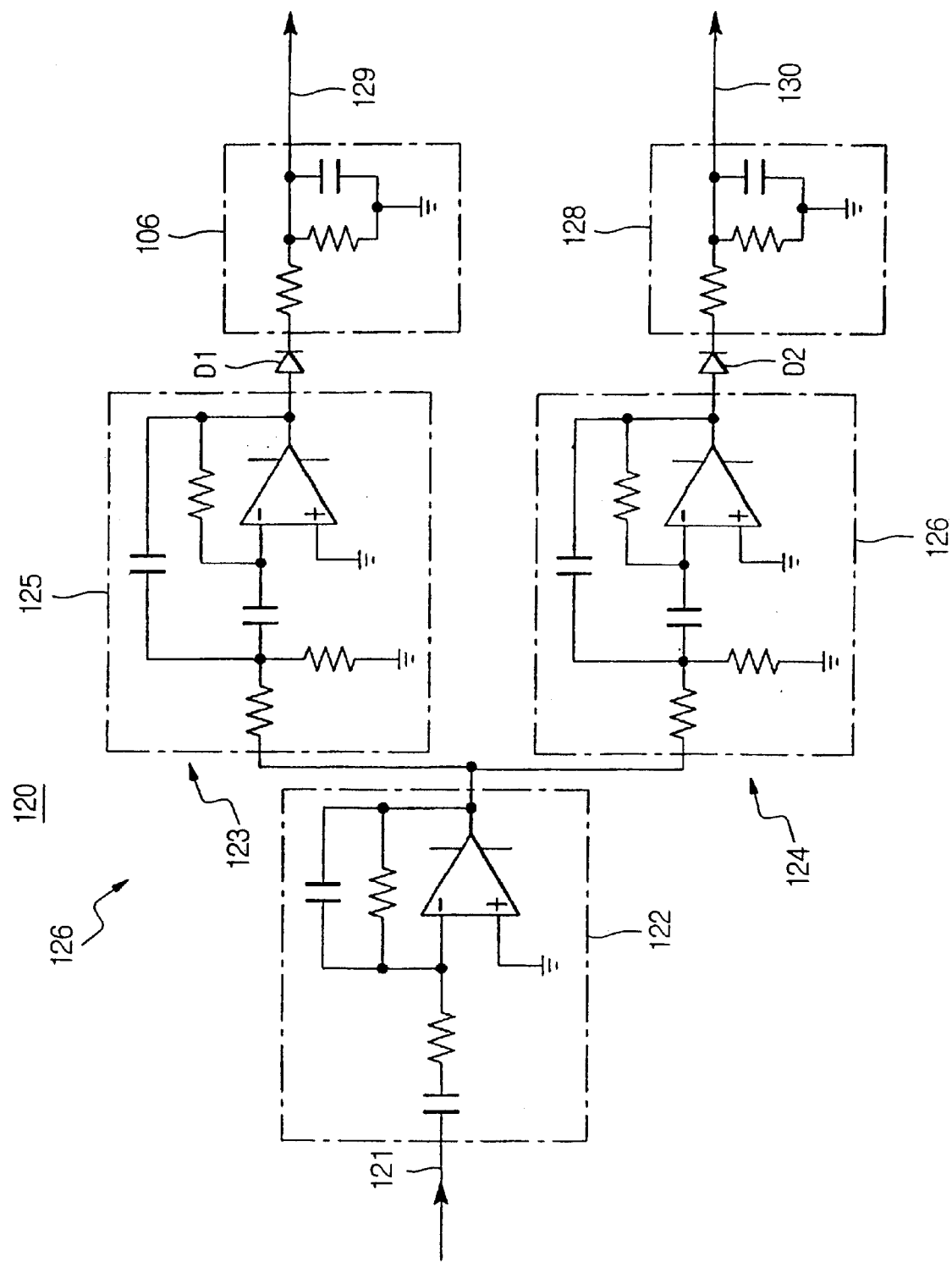
FIG. 11 is a schematic diagram illustrating an example of the prior art arc fault detection circuit.
Figure 12:
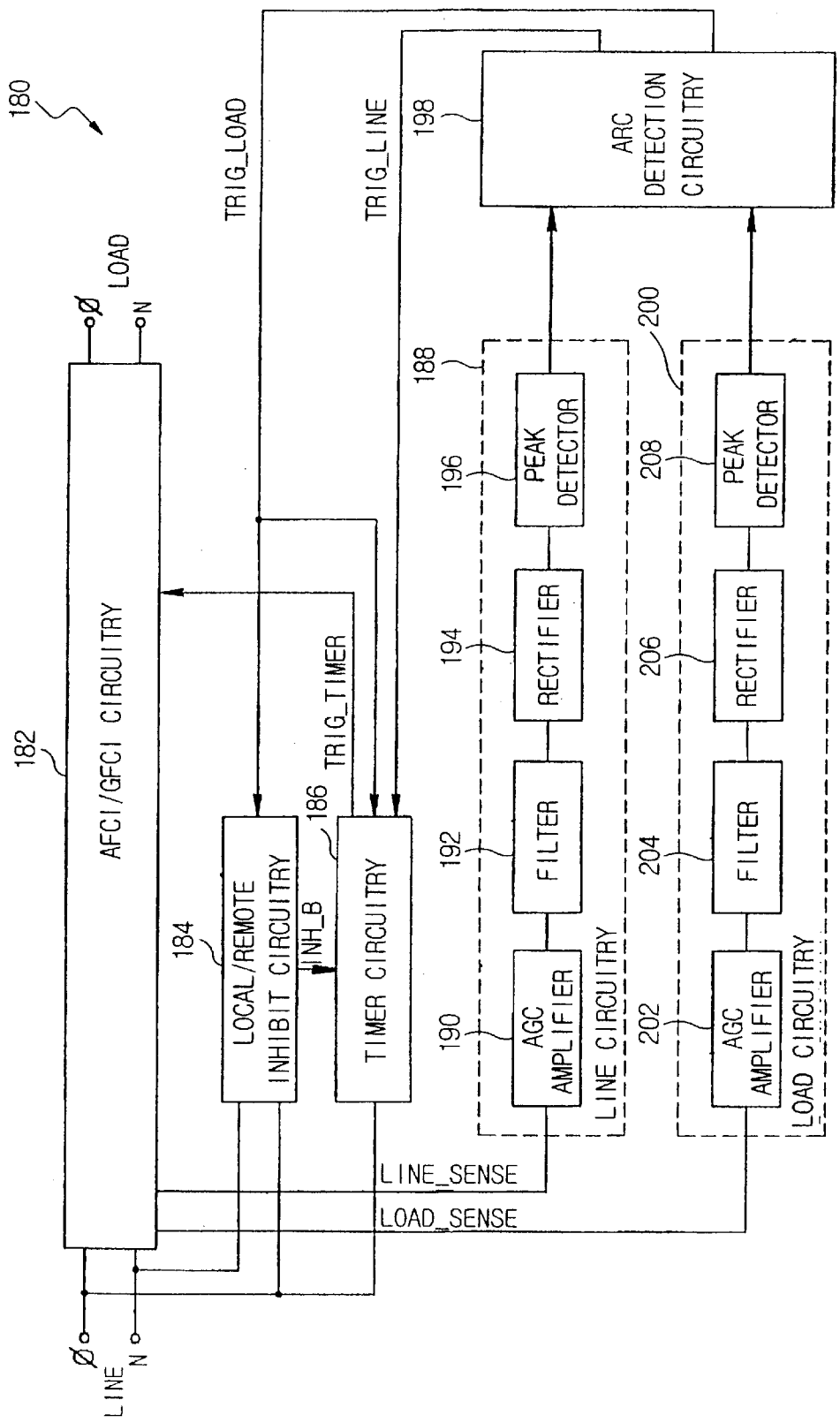
FIG. 12 is a block diagram illustrating another example of the prior art arc fault/ground fault circuit interrupter (AFCI/GFCI) device.
Figure 13:
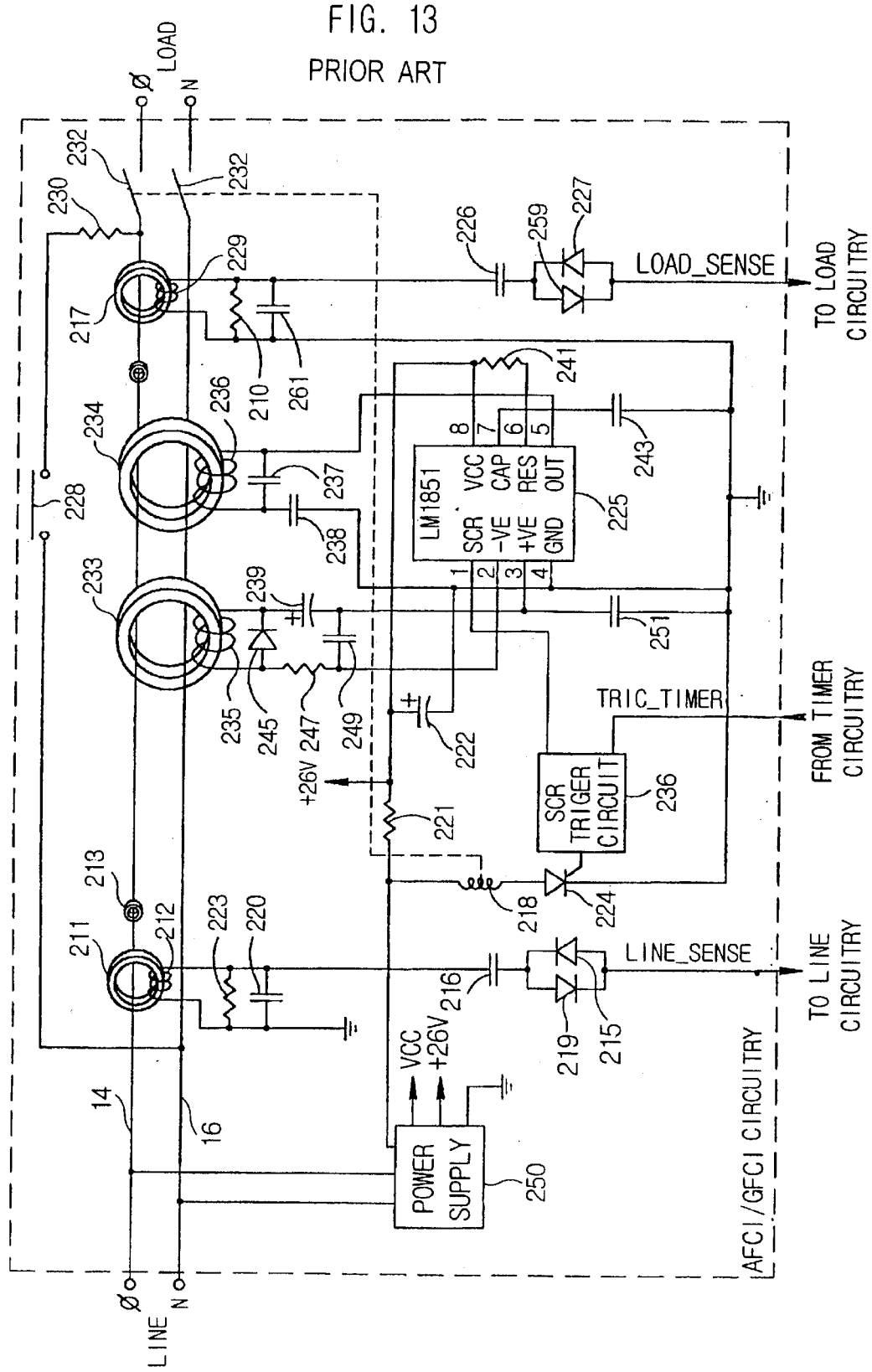
FIG. 13 is a schematic diagram illustrating the AFCI/GFCI circuitry portion of the prior art arc fault detection device of FIG. 12.
Figure 14:
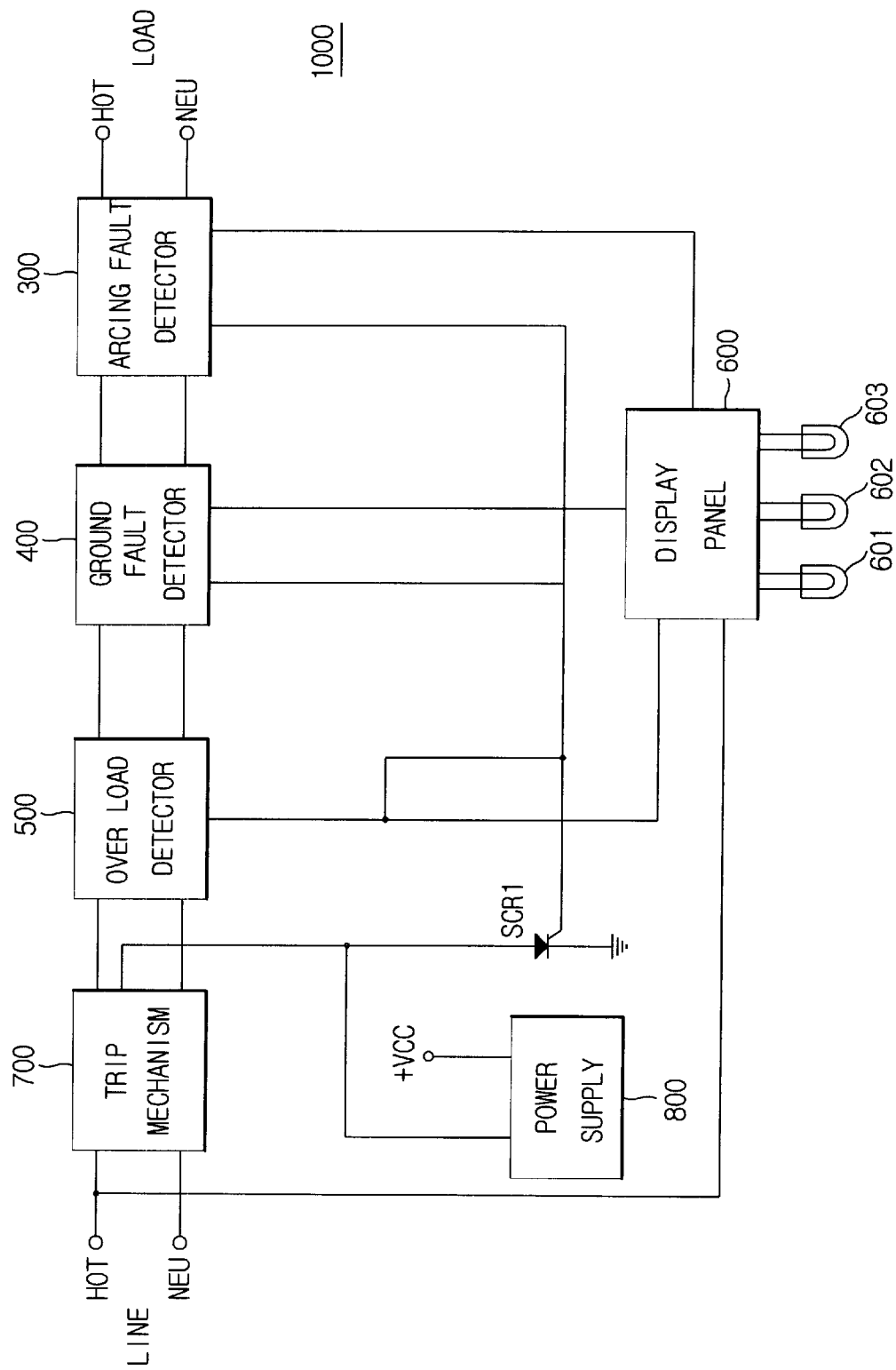
FIG. 14 is a block diagram illustrating a circuit breaker comprising the AFCI, GFCI, and OLCI of the present invention.

A block diagram illustrating the circuit breaker comprising an Arc Fault Circuit Interrupter (AFCI), a Ground Fault Circuit Interrupter (GFCI), and an Overload Circuit Interrupter (OLCI) of the present invention is shown in FIG. 14. The circuit breaker 1000 includes an AFCI 300, a GFCI 400, an OLCI 500, a display panel 600, and a trip circuitry 700 between a phase wire (HOT) and a neutral wire (NEU). The display panel 600 displays fault generation to the outside, which indicates at least one selected from the group consisting of an arc fault, a ground fault or an overload according to at least one of the trip signals generated from the AFCI 300, GFCI 400 or OLCI 500 respectively. The display panel 600 may comprise display elements 601, 602, 603 for displaying an arc fault, ground fault and overload respectively. The trip circuitry 700 disconnects AC power from the circuit breaker 1000, when an arc fault, ground fault or overload occurs. The trip circuitry 700 is controlled by a silicon controlled rectifier (SCR1), which receives trip signals from the AFCI 300, GFCI 400, and OLCI 500. The power supply 800 provides a source for operation of the SCR1, AFCI 300, GFCI 400, OLCI 500, display panel 600 and the trip circuitry 700 of the circuit breaker 1000 respectively. The SCR1 may be inside or outside the trip circuitry 700.

Figure 15:
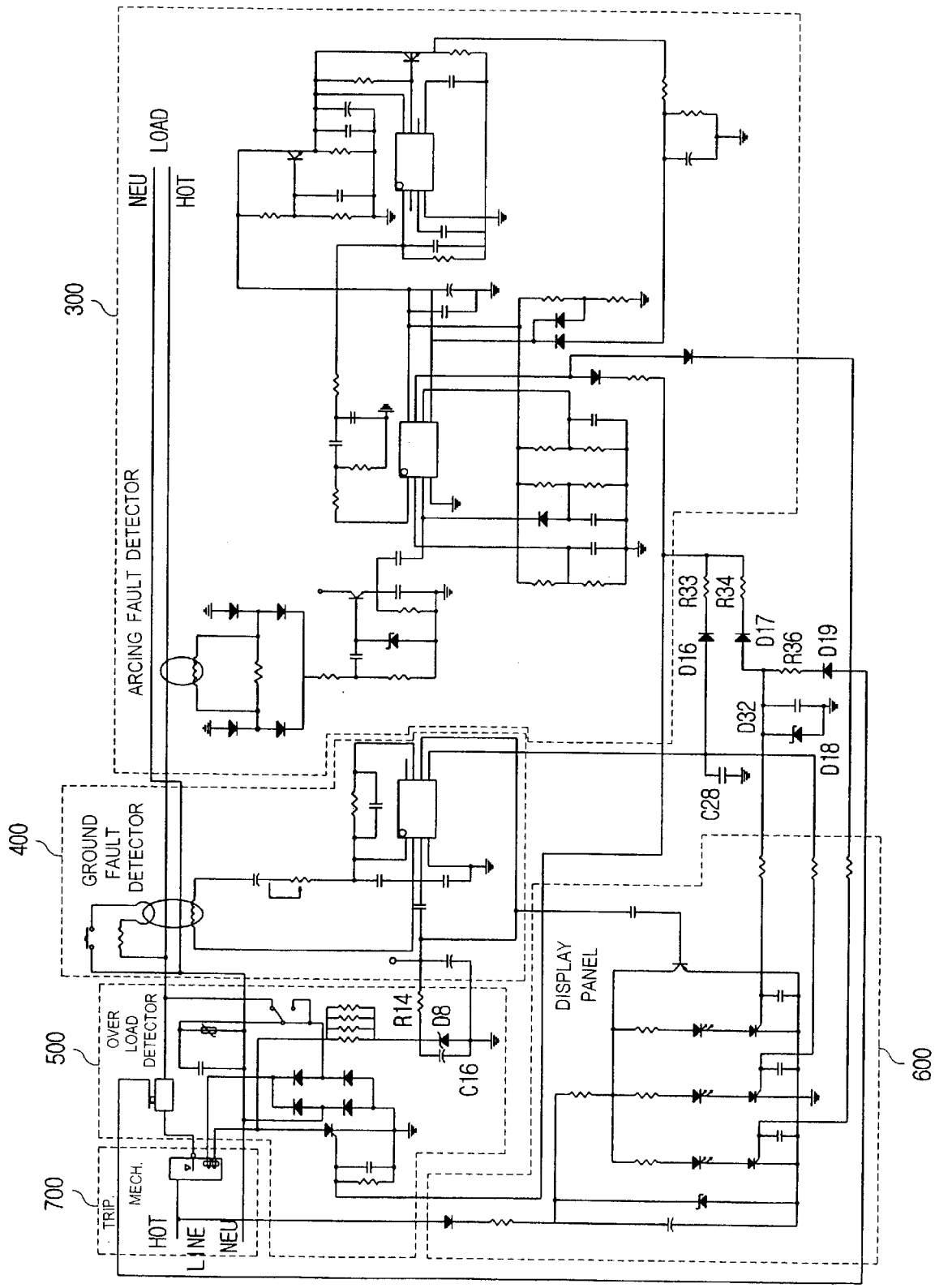
FIG. 15 is a schematic diagram illustrating circuit breaker comprising the AFCI, GFCI, and OLCI of the present invention in more detail.

A schematic diagram illustrating a circuit breaker comprising the AFCI, GFCI, and OLCI of the present invention in more detail is shown in FIG. 15.

The arc fault trip signal provided from the AFCI 300 enters the SCR1 gate via diode D13 and resistor R27, and enters the SCR2 gate via diode D14 and resistor R38. Thus, when an arc fault occurs, the light emitting diode LED1 displays the arc fault and the SCR1 trips the circuit breaker 1000. As a result, the electrical system is interrupted.

Similarly, a ground fault trip signal provided from the GFCI 400 enters the SCR1 gate via diode D16 and resistor R33, and enters the SCR3 gate via resistor R37. The overload trip signal provided from the OLCI 500 enters the SCR1 gate via diode D19 and resistor R36 in series with diode D17 and resistor R34, and enters the SCR4 gate via resistor R35. Therefore, the SCR1 trips the circuit breaker 1000 according to the trip signal from the GFCI 400 or OLCI 500. The LED2 display a ground fault and the LED3 displays an overload to the outside.

In other words, when at least one selected from the group consisting of an arc fault, ground fault or overload occurs, power is not provided on the AC line coupled to the load, but is provided to the display panel 600 for indicating an arc fault, ground fault or overload.

After the circuit breaker 1000 is tripped by an arc fault, ground fault or overload, the manager can reset the circuit breaker 1000. If the manager turns the power on with the circuit breaker 1000, the AFCI 300, GFCI 400 and OLCI 500 receive the power from its source and restart the process of detecting faults. Bipolar Junction Transistor (BJT) Q3 in the display panel 600 is turned on by the manager's action, and LED1, LED2 and LED3 all simultaneously turn off. Thus, there is no need to reset LED1, LED2 and LED3 in the display panel 600 also.

The preferred embodiments of the AFCI, GFCI, OLCI, trip circuitry and display circuitry will now be explained in more detail.

Figure 16:
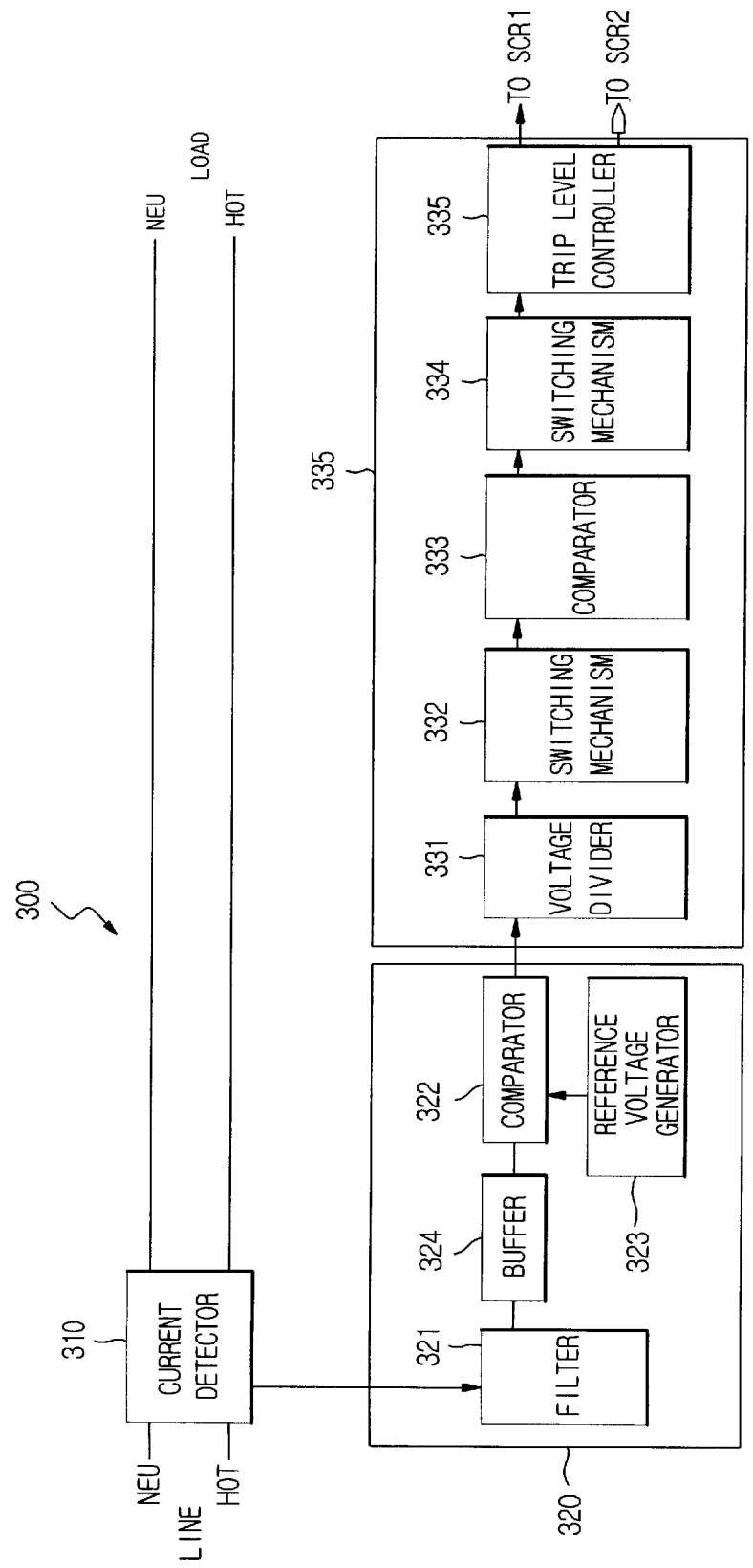
FIG. 16 is a block diagram illustrating the AFCI of the present invention.

A block diagram illustrating the AFCI of the present invention is shown in FIG. 16. The current detector 310 detects current variation in the between phase wire (HOT) and neutral wire (NEU) and produces an arc voltage in accordance with the variation of current. The arc fault detector 320 changes the level of the arc voltage from the current detector 310 within a specified range, and produces an arc fault indicative signal in the case of an arc fault occurrence. When the arc fault indicative signal of the arc fault detector 320 corresponds to a predetermined level, the trip signal generator 330 provides an arc fault trip signal TOSCR1 for triggering the circuit breaker 1000 and an arc fault display signal TOSCR2 for operating the display panel 600.

The arc fault detector 320 may include a filter 321 for diminishing the amount of harmonic frequency or overtone from the arc voltage of the current detector 310, a buffer 324 for providing a stable voltage with buffering the arc voltage filtered through the filter 321, a reference voltage generator 323 for generating reference voltage, and a comparator 322 for comparing the buffered arc voltage through the buffer 324 with reference voltage from the reference voltage generator 323. In the filter 321, a noise interrupter diminishes noise components from the detected arc voltage, a rectifier half wave rectifies or full wave rectifies the non-noise arc voltage and a level limiter isolates the high voltage level from the rectified arc voltage. The reference voltage generator 323 provides a low level signal corresponding to the driving voltage of an electric device, which may be generated at the moment of driving. Also, it may provide bias voltage to the comparator 322 in order to prevent abnormal action. The comparator 322 cuts signal less than reference voltage, and produces an arc fault indicative signal according to the result of comparing the limited arc voltage from the filter 321 with the reference voltage. The comparator 322 amplifies the arc fault indicative signal, which may be used to determine an arc fault. It may use at least one operational amplifier (OP amp). The trip signal generator 330 may include a voltage divider 331 for dividing the arc fault indicative signal from the arc fault detector 320, a first switching mechanism 332 for diminishing noise, a comparator 333 for comparing the divided arc fault indicative signal from the voltage divider 331 with specified reference signal, and a trip level controller 335 for on/off control of AC power supplied to the circuit breaker 1000 according to the signal provided from the second switching mechanism 334.

Figure 17:
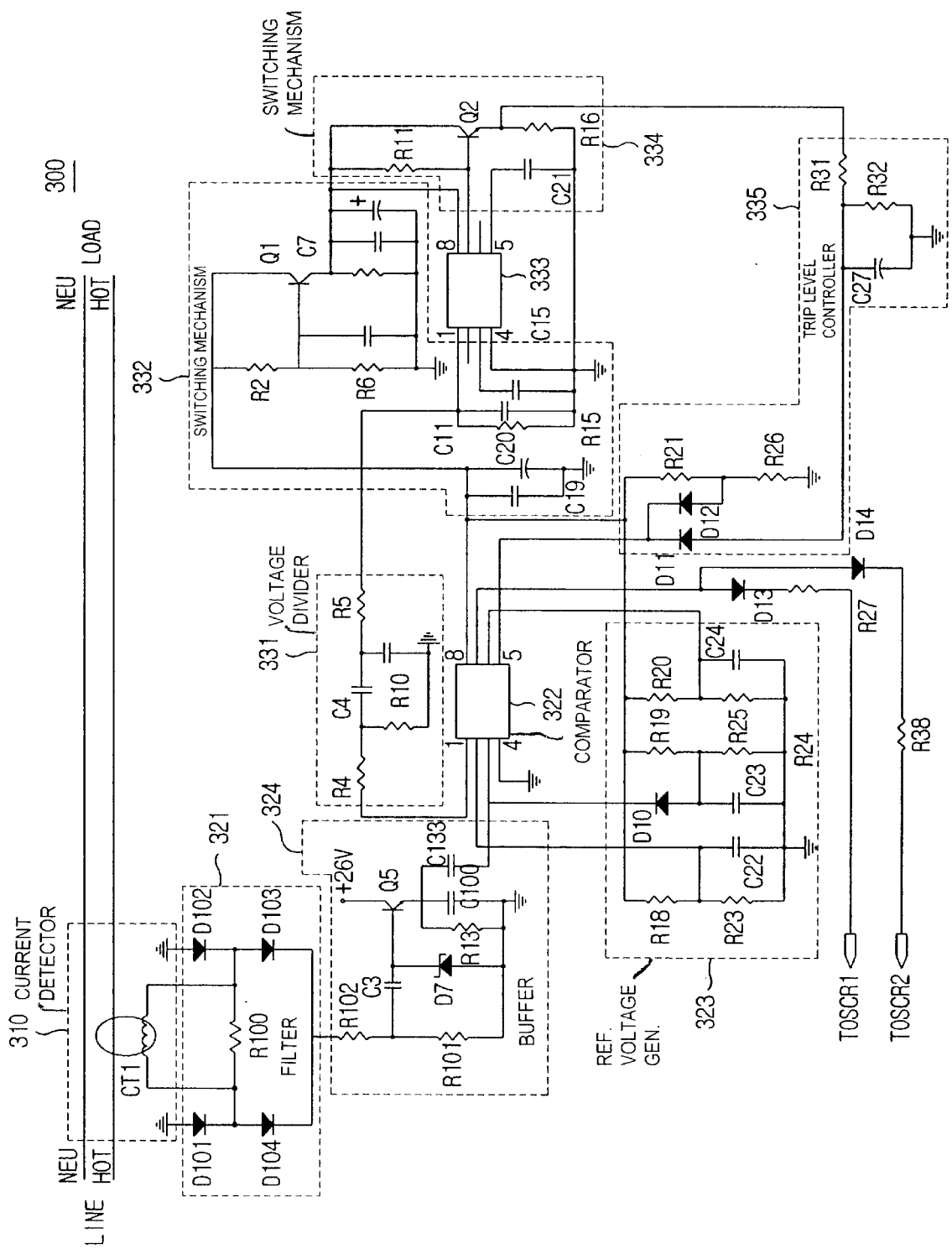
FIG. 17 is a schematic diagram illustrating the AFCI of the present invention in further detail.

A schematic diagram illustrating the AFCI of the present invention in more detail is shown in FIG. 17.

The Current Transformer CT1 can be used to detect current variation to time on the AC line, even though the prior AFCI, such as U.S. Pat. No. 5,963,406, used an integrated circuit (IC). For example, LM 1851 was used for detecting current variation. In the case of using an LM 1851 IC, two magnetic cores and two coils are needed to detect current variation on the AC line, because the IC determines an arc fault from two detected signals via the cores and coils. However, in the present invention, it is possible to use only one CT CT1 for detecting current variation without an IC. The current detector 310 comprises current transformer CT1, which includes a magnetic core and a coil to be installed on the phase wire (HOT). The CT1 detects current variation on the AC line. The detected current variation is converted to the arc voltage and enters the arc fault detector 320.

The detected current variation through the current detector 310 is similar to an output of a dimmer as well as a driving current based on the operation of the electric motor. Therefore, a resistor R100 is inserted to ends of the current transformer CT1 in order to differentiate the output of the dimmer and arc fault. For full wave rectification, diodes D101, D102 are coupled between the resistor R100 and a ground. Also, each anode of diodes D103, D104 is coupled to the resistor R100 and cathodes of the diodes D103, D104 are connected together. Having described and illustrated the principles of full wave rectification with reference to an illustrated embodiment, it will be recognized that half wave rectification can be embodied. In other words, a current detection can be accomplished using the half wave rectification because alternative current has generally a frequency of 60 Hz or over.

The rectified arc voltage by the filter 321 is delayed through a buffer 324, which is composed of common emitter amplifier. A plurality of resistors R101, R102 of the buffer 324 is serially coupled between cathodes of the diodes D103, D104 and ground. A capacitor C3 is coupled between inner node of the resistors R101, R102 and base of a Bipolar Junction Transistor (BJT) Q5. A power +26V is supplied to collector of the BJT Q5. A capacitor C100 and a resistor R13 are coupled in parallel between emitter of the BJT Q5 and ground. Also, a zener diode D7, which is coupled between base of the BJT Q5 and ground, limits the arc voltage of the base of the BJT Q5 to a low level. In general, the base voltage of the BJT Q5 will be limited to maximum 20 volts.

The comparator 322, which may comprise the RC4558, NJM4558, KA4558 or other integrated circuit (IC), compares the limited arc voltage with maximum 20 volts through the buffer 324 with reference voltage from a reference voltage generator 323. The reference voltage generator 323 provides a first reference voltage to pin 2 of the IC used as comparator 322 and a second reference voltage to pin 6 of the IC. The first reference voltage enters to IC 322 from resistors R18, R28 in series to ground and capacitor C22 in parallel to resistor R23. The second reference voltage enters from resistors R20, R25 in series to ground and capacitor C24 in parallel to resistor R25. Pin 3 of the IC 322 receives the driving voltage through resistors R18, R25 in series to ground, capacitor C23 in parallel to resistor R25, and diode D10 between pin 3 and capacitor C23.

The comparator (IC) 322 in one embodiment of the present invention comprises two op amps. In the first op amp, pins 2 and pin 3 are inputs and pin 1 is the output. In the second op amp, pins 5 and pin 6 are inputs and pin 7 is the output. The first op amp provides high-level voltage when the rectified arc voltage from the filter 321 is larger than the first reference voltage. Thus, a driving voltage of the electric device and a spike noise are limited in the comparator (IC) 322 according to the comparison with the first reference voltage.

Generally, the driving voltage of the electric device is no more than 4 volts. Thus, the comparator 322 provides a high state arc fault indicative signal if the input signal of pin 3 ranges between 4 and 20 volts. The arc fault indicative signal (from pin 1 of the comparator 322) is divided in voltage divider 331. Voltage divider 331, which is included with trip signal generator 300, comprises a resistor R4, a capacitor C4, a resistor R5 (serially connected to pin 1 of comparator 322), a resistor R10 between resistor R4 and the ground, and capacitor C8 between capacitor C4 and the ground. For example, comparator 333 assures an arc fault if the divided arc fault indicative signal from the voltage divider 331 is larger than the specified level, i.e., 16 mV. Switching mechanism 332 provides a power signal to the comparator 333. Switching mechanism 332 may use a common emitter amplifier, which comprises plural resistors R2, R6, R7, R11, capacitors C14, C5, C6, C7 and transistor Q1, which is depicted as a bipolar junction transistor (BJT) in FIG. 17.

Comparator 333, which may comprise a level sensor such as NJM 2072, provides a high-level output signal, when the divided arc fault indicative signal from voltage divider 331 has a higher level than the reference trip level. The output signal of the comparator 333 enters switching mechanism 334. If comparator 333 provides a high-level output signal to switching mechanism 334, the BJT Q2 of the switching mechanism 334 is turned on to generate a one-time arc fault signal. Switching mechanism 334 may comprise an emitter follower with BJT Q2.

The instant arc fault signal of the switching mechanism 334, which is generated in the emitter of BJT Q2, enters trip level controller 335. Trip level controller 335 consists of resistor R31 in series to the emitter of BJT Q2, capacitor C27 and resistor R32 in parallel with diode D11, D12, and resistors R21, R26. The one-time arc fault signal will be charged in capacitor C27 concurrently. The one-time arc fault signal is similar to driving pulse such as is generated when electric devices drive, but it only continues for limited time. Therefore, it is necessary to set a reference trip level in trip level controller 335, which is controlled by the value of resistor R32 or capacitor C27. Preferably, the circuit breaker will be triggered if continuously charged arc fault signal (an unbroken plural of the one-time arc fault signal) in capacitor C27 is larger than the reference trip level. This prevents the error that may occur with only instant arc fault signal, possibly caused by the driving voltage of electric devices.

It is preferable that the reference trip level is controllable because a fixed trip level means more time for testing and a more expensive test. The time to trigger the circuit breaker is controllable by using a variable resistor for resistor R32 in trip level controller 335. Therefore, not only are arc fault test time and cost diminished, but also fires caused by arc fault are effectively prevented when the charged arc fault signal in capacitor C27 exceeds tolerance and instantly triggers the circuit breaker.

Also, the output signal of comparator 333 is irregular, so an error may occur due to the driving voltage of the electric device. Thus, a trip signal generator comprising a signal level sensor is necessary. With reference to FIG. 17, the second op amp in comparator 322 acts as a signal level sensor. It is also possible to arrange that an output signal of arc fault detector 320 directly enters trip level controller 335 without switching mechanism 332, 334 and comparator 333.

On the other hand, arc fault circuit interrupter 300 may have test switch. It will be used to test operation of the arc fault circuit interrupter 300.

Figure 18:
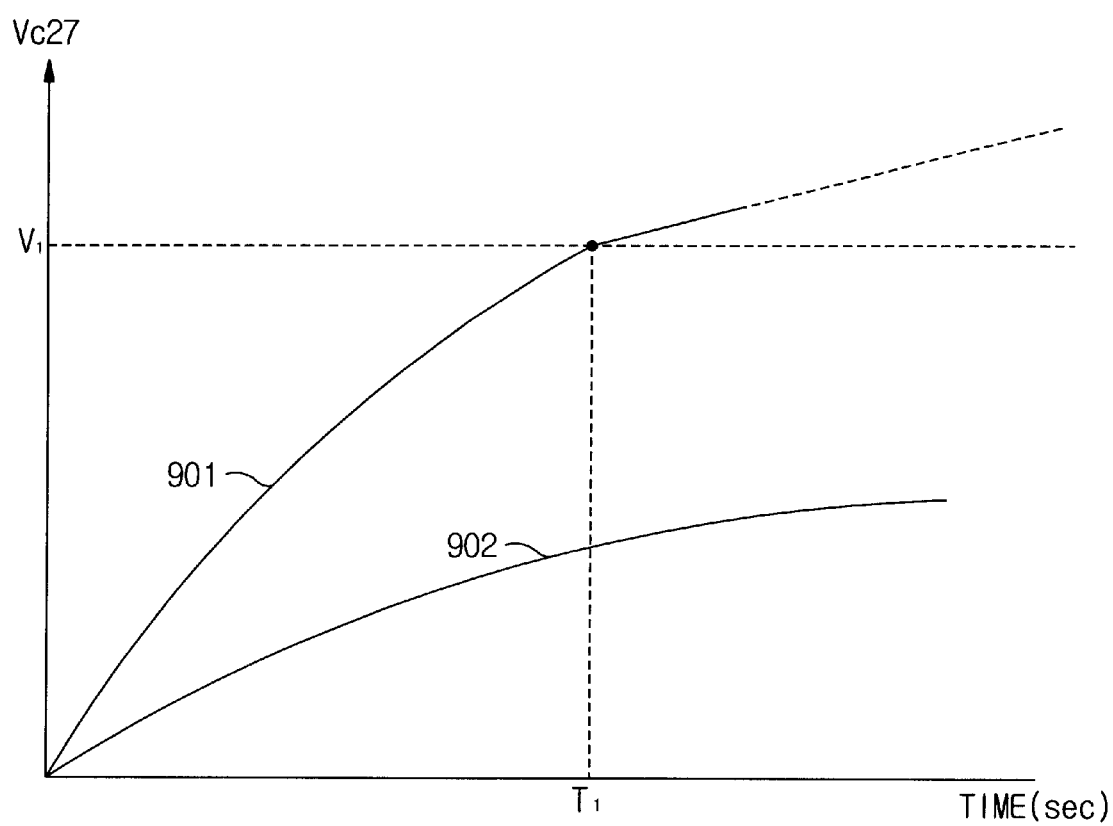
FIG. 18 is a graph illustrating the charged voltage in the capacitor C27 of the present invention.

A graph illustrating the charged arc fault signal in capacitor C27 of the present invention is shown in FIG. 18. The charged arc voltage Vc27 of trip level controller 335 increases by continuous generation of the arc fault signal. The 902 indicates that charged arc voltage Vc27 arrives at reference trip level V1 in time t1 with continuous arc fault signal, and the 901 indicates that charged arc voltage Vc27 does not arrive at reference trip level V1 in time t1 with instant discrete arc fault signal such as the driving voltage of the electric device. In the case of continuous arc fault signal, the charged arc voltage Vc27 in capacitor C27 has the high increment. In the other case of instant discrete arc fault signal, such as driving voltage, charged arc voltage Vc27 has the low increment. So arc voltage Vc27 will be discharged any time the instant arc fault signal does not occur. Therefore, the operation error in the circuit breaker created by driving voltage is prevented by the trip in case of continuous arc fault generation.

The charged arc voltage feeds back into the comparator 322. This is for the purpose of comparing the charged arc voltage in capacitor C27, which enters into pin 5 of the second op amp in comparator 322, with a second reference voltage entered into pin 6 in comparator 322. The amplified trip signal resulting from the comparison is generated at pin 7 of the comparator 322. Therefore, continuous arc fault signal produces high-level arc fault trip signal TOSCR1 and high-level display signal TOSCR2 from pin 7 of comparator 322. The high-level trip signal TOSCR1 turns on the silicon controlled rectifier SCR1 for operation of trip circuitry 700, and high-level display signal TOSCR2 will turns on the silicon controlled rectifier SCR2 in display panel 600. Display panel 600 indicates the generation of arc fault and trip circuitry 700 interrupts the circuit breaker.

Figure 19:
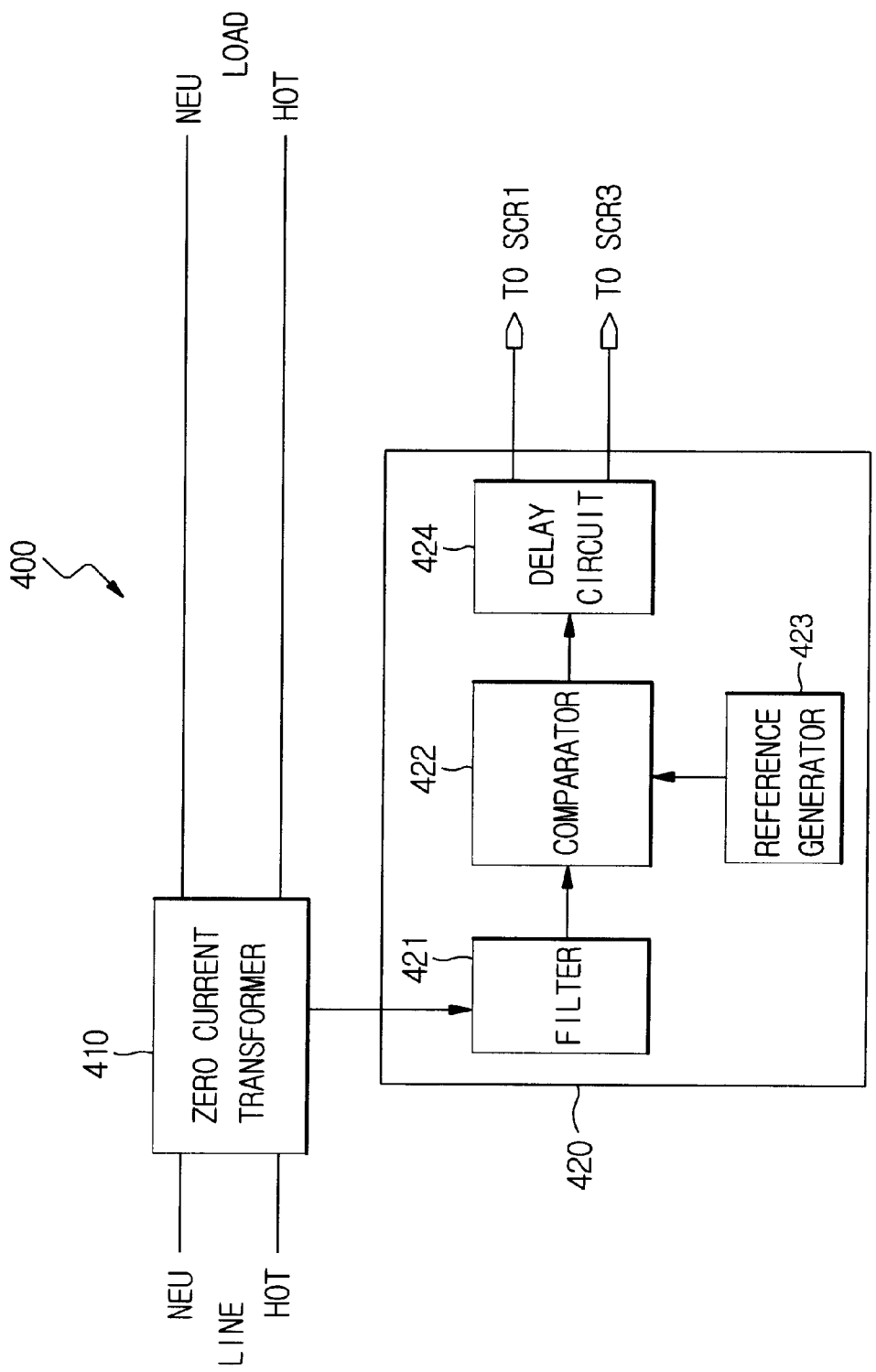
FIG. 19 is a block diagram illustrating the GFCI of the present invention.

A block diagram illustrating the GFCI of the present invention is shown in FIG. 19. GFCI 400 includes a zero current transformer (ZCT) 410 for comparing inflow current with outflow current on the phase wire (HOT) and neutral wire (NEU), and ground fault judgment circuitry 420. ZCT 410 generates high-level ground fault voltage when the inflow current is different from outflow current. Ground fault judgment circuitry 420 comprises a filter 421 for limiting the ground fault voltage of the ZCT 410, a reference generator 423 for providing an operation power signal, comparator 422 and delay circuit 424.

If current leakage is detected on the AC line of the phase wire (HOT) and the neutral wire (NEU), the ground fault voltage of ZCT 410 is provided to filter 421. Comparator 422 determines ground fault by comparing the limited ground fault voltage of the filter 421 with reference voltage from reference generator 423. When the limited ground fault voltage is larger than the reference voltage, comparator 422 produces high-level ground fault indicative signal. Delay circuit 424 charges the ground fault indicative signal of comparator 422 to any given trip level for preventing error from harmonic noise or induction noise by electromagnetism. If the charged ground fault indicative signal exceeds the specified trip level, delay circuit 424 provides ground fault trip signal TOSCR1 entered into SCR1 and ground fault display signal TOSCR3 for controlling display panel 600.

Figure 20:
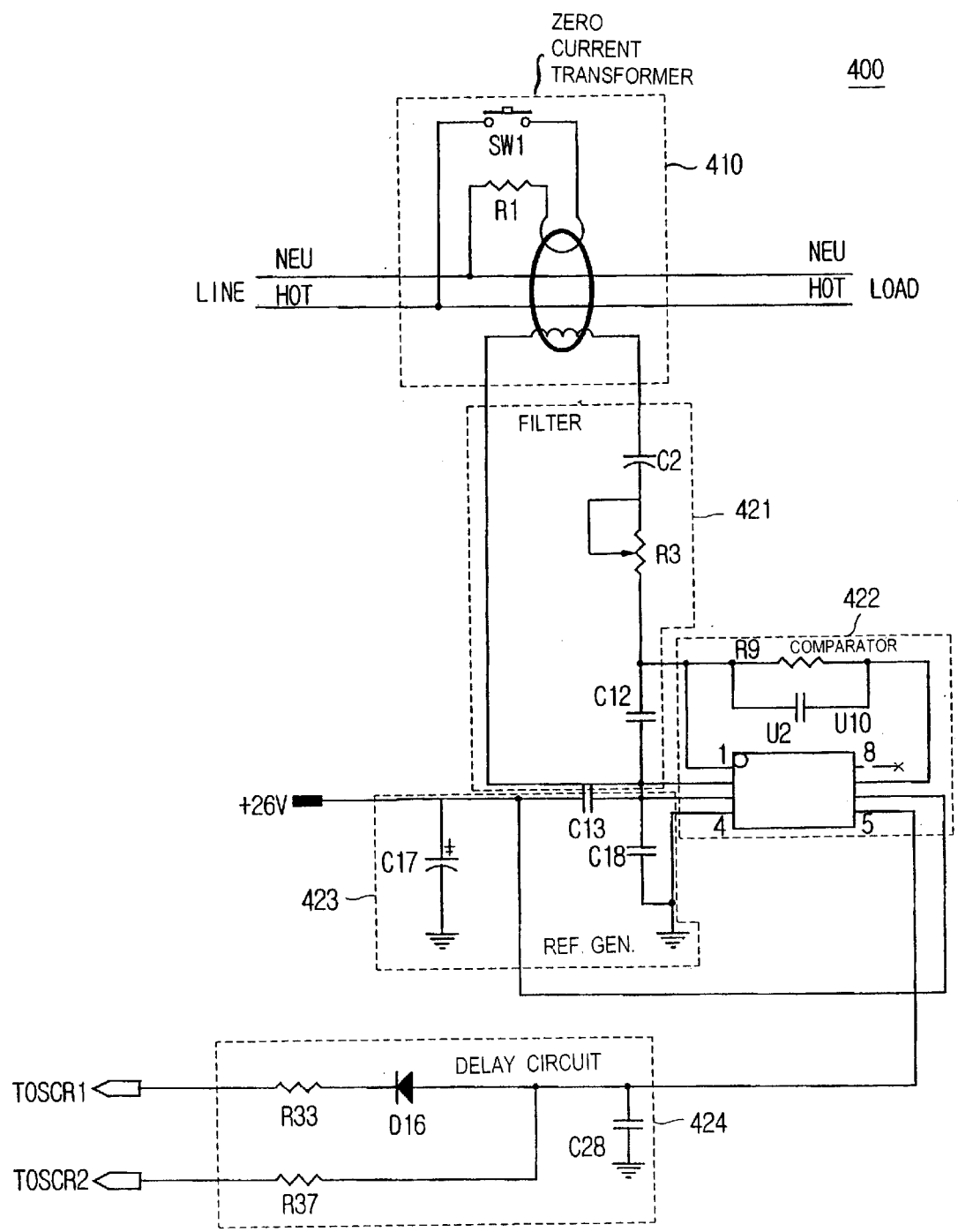
FIG. 20 is a schematic diagram illustrating the GFCI of the present invention in more detail.

A schematic diagram illustrating the GFCI of the present invention in more detail is shown in FIG. 20. ZCT 410 detects current leakage between the phase wire (HOT) and the neutral wire (NEU) of an AC electrical power line. Also, it may comprise test switch SW1 for testing the operation of the GFCI.

ZCT 410 generates ground fault voltage when inflow current from line to load is different from outflow current from load to line. The ground fault voltage of the ZCT 410 enters into filter 421. Filter 421 including capacitors C2, C12 and resistor R3, limits the ground fault voltage of ZCT 410 and provides limited ground fault voltage to comparator 422, which may comprise a low-level ground fault circuit interrupter such as RV4145. Preferably, the resistor R3 is variable resistor, which induces the control of ground fault voltage level. Comparator 422 receives the reference voltage from reference voltage generator 423, which comprises capacitors C13, C17, and C18. Resistor R9 and capacitor C10 may be coupled to the comparator 422 for feeding back the first output of comparator 422 to the second input terminal, pin 7. The ZCT 410 also provides ground fault voltage in the case of detection of induced noise or harmonic noise as well as current leakage. Delay circuit 424 delays ground fault indicative signal from pin 5 of comparator 422 for any given time. Delay circuit 424 does not generate high-level ground fault trip signal until the ground fault indicative signal of the comparator 422 exceeds the specified level. Therefore, delay circuit 424 prevents the operation error resulting from the harmonic or induced noise. It comprises resistors R33, R37, diode D16 and capacitor C28. If the ground fault is detected in the GFCI, the ground fault trip signal TOSCR1 and ground fault display signal TOSCR2 are provided to the SCR1 and display panel 600 respectively.

Figure 21:
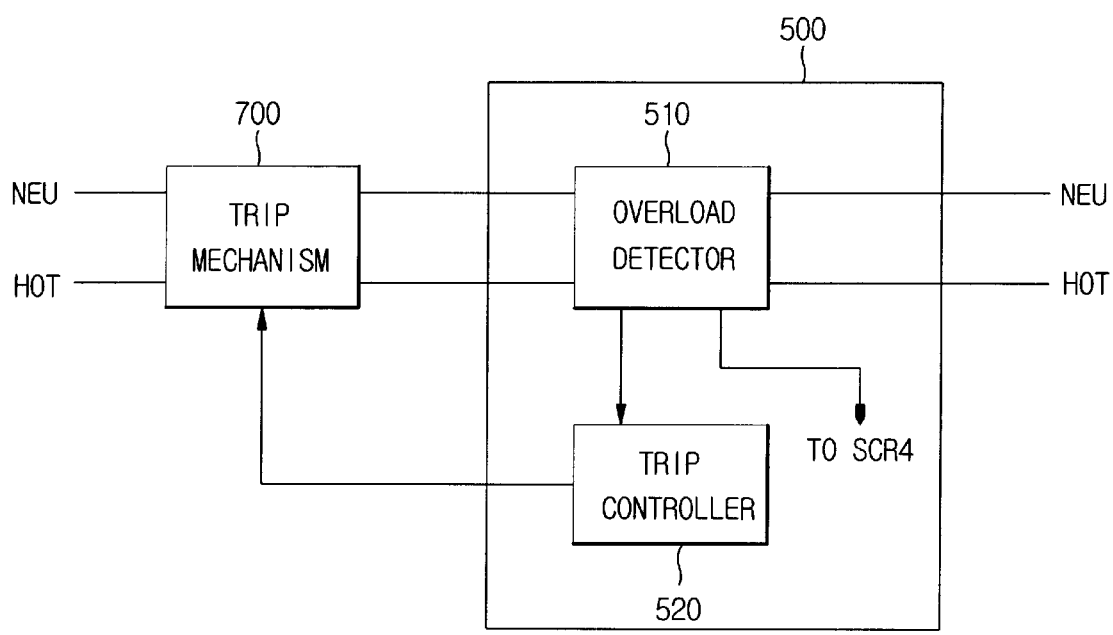
FIG. 21 is a block diagram illustrating the OLCI 500 and trip mechanism 700 of the present invention.

A block diagram illustrating OLCI 500 and trip mechanism 700 of the present invention is shown in FIG. 21. OLCI 500 includes overload detector 510 in the AC electrical power line and trip controller 520 for controlling the trip mechanism 700 by the output of overload detector 510. The outputs of overload detector 510 enter into trip controller 520 and display panel 600 respectively.

Figure 22:
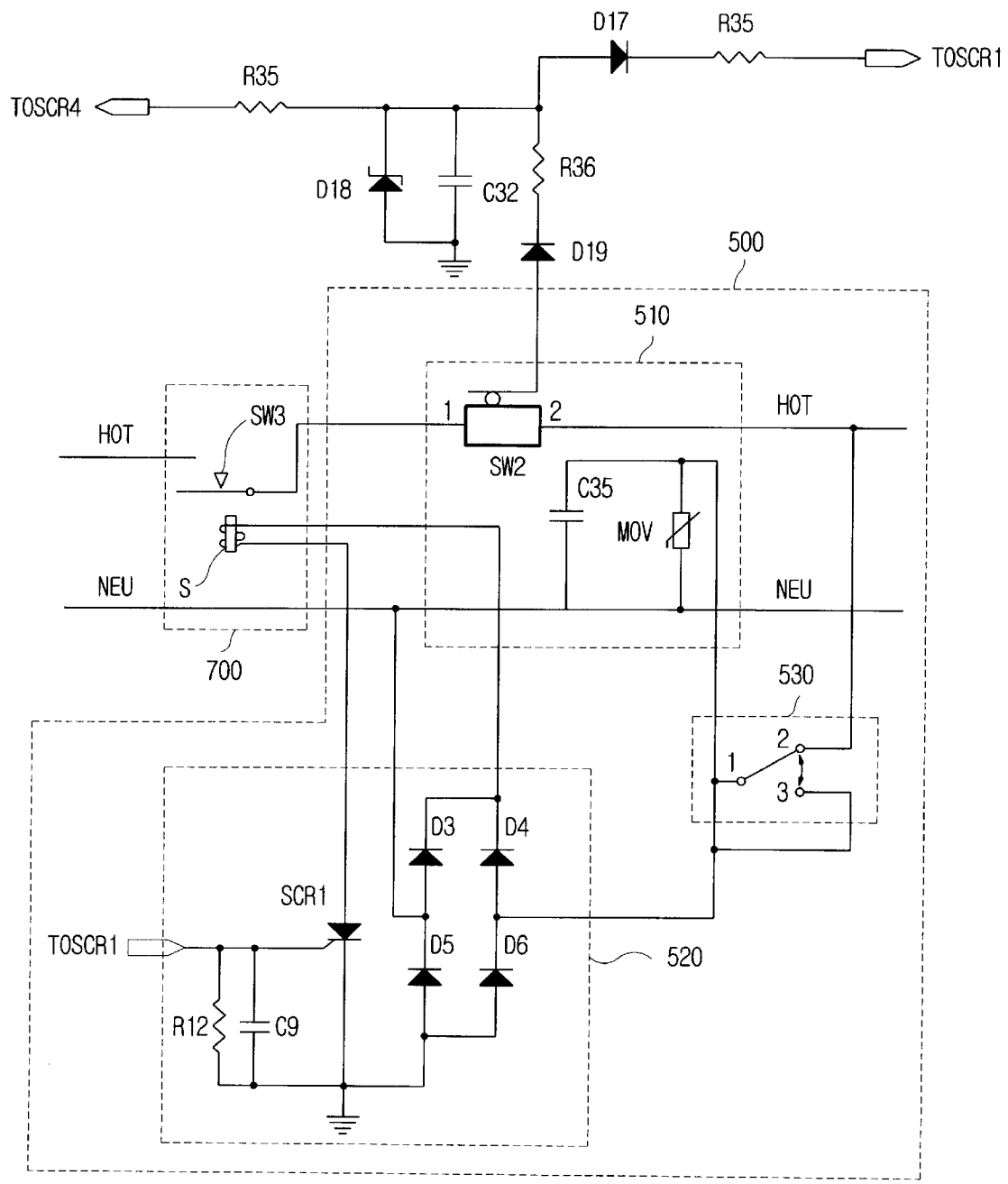
FIG. 22 is a schematic diagram illustrating the OLCI 500 and trip mechanism 700 of the present invention in more detail.

A schematic diagram illustrating OLCI 500 and trip mechanism 700 of the present invention in more detail is shown in FIG. 22. Overload detector 510 in the OLCI 500 comprises a metal oxide varistor (MOV) connected between the phase wire (HOT) and the neutral wire (NEU), and a sensor switch SW2, which may comprise a bimetal that bends from the heat by overload. If the overload occurs in the electric device, the bent bimetal contacts the lines coupled to trip controller 520. Trip controller 520 comprises plural of diodes D3, D4, D5, D6 in serial and parallel respectively. With reference to FIG. 22, the SCR1 for controlling the circuit breaker is depicted in trip controller 520. In order to interrupt electric device when arc fault, ground fault or overload is detected, trip mechanism 700 also includes a solenoid S and a switch SW3 for interrupting power entering the electric device. According to the overload generated in the AC electrical power line, current enters into solenoid S through plural diodes D3, D4, D5 or D6 of trip controller 520. The current via solenoid S creates a magnetic pulse, and this magnetic pulse triggers switch SW3 for interrupting power to the electric device with the result that circuit breaker turns off. Resistors R34, R35, R36, capacitor C32 and diodes D17, D18, D19 act as regulators by controlling overload trip signal TOSCR1 and overload display signal TOSCR4, which are provided at a safe level to SCR1 of trip mechanism 700 and SCR4 of display panel 600 respectively for the purpose of driving them.

Therefore, if AFCI 300 detects the arc fault, GFCI 400 detects the ground fault or OLCI 500 detects the overload, SCR1 is turned on by high-level trip signal TOSCR1, switch SW3 for interrupting power is triggered by the current of solenoid S through SCR1 and the circuit breaker is interrupted.

In America, there are certain regulations controlling the triggering of circuit breakers. For example, the circuit breaker must be triggered within 1 hour in the case of 135% current flow, and 4 minutes in the case of 200% current flowing over rated current for AC 120 volts, 15 or 20 A. The regulations may be different in each country. However, by controlling the operating point of the SCR1, various standards can be met.

Also, the circuit breaker may include pressure controller 530 for enduring inner pressure resulting from an arc fault, ground fault or overload. The pressure controller 530, which couples between inner node of diodes D4, D6 and varistor MOV, may comprise a switch interlocking to trip switch SW2. If the circuit breaker is an operation state, node 1 and node 2 of pressure controller 530 are connected. On the other hand, if the circuit breaker is interrupted by an arc fault, ground fault or overload, node 1 and node 3 are connected. Thus, phase wire HOT is isolated from trip controller 520, so that the circuit breaker can escape from the inner pressure.

Furthermore, a display panel is necessary for indicating an arc fault, ground fault or overload, so that a manager may recognize these problems immediately.

Figure 23:
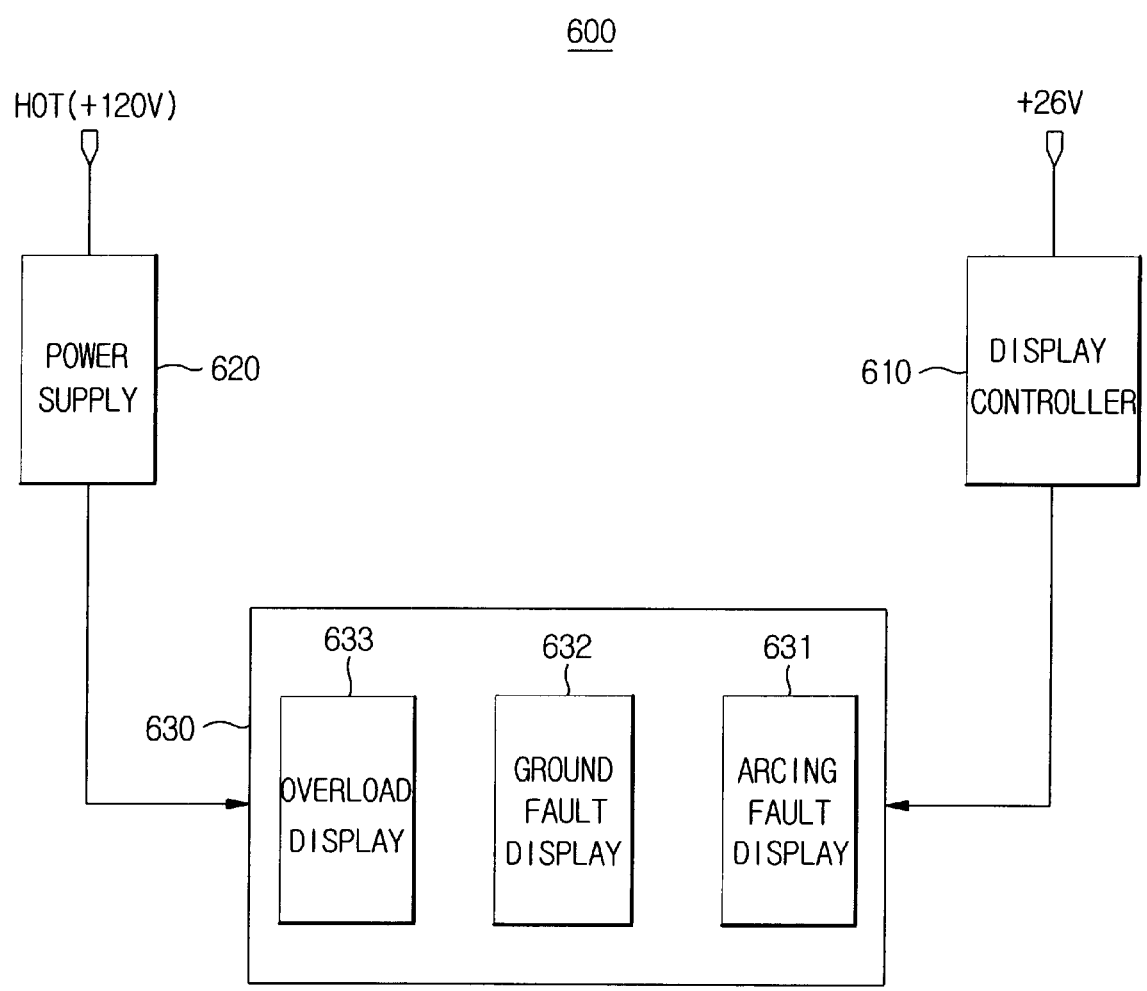
FIG. 23 is a block diagram illustrating the display panel 600 of the present invention.

A block diagram illustrating display panel 600 of the present invention is shown in FIG. 23. Display panel 600 includes display element 630, which comprises arc fault display element 631 for indicating arc fault, ground fault display element 632 for indicating ground fault and overload display element 633 for indicating overload respectively, display controller 610 and power supply 620. Display elements 631, 632, 633 use a light emitting diodes (LED) as a display device in FIG. 23, but other display devices may be equally appropriate. Display controller 610 controls display elements 631, 632, 633 by using +26 volts power. Power supply 620 provides power voltage with a certain range to the light emitting diodes in display element 630.

Figure 24:
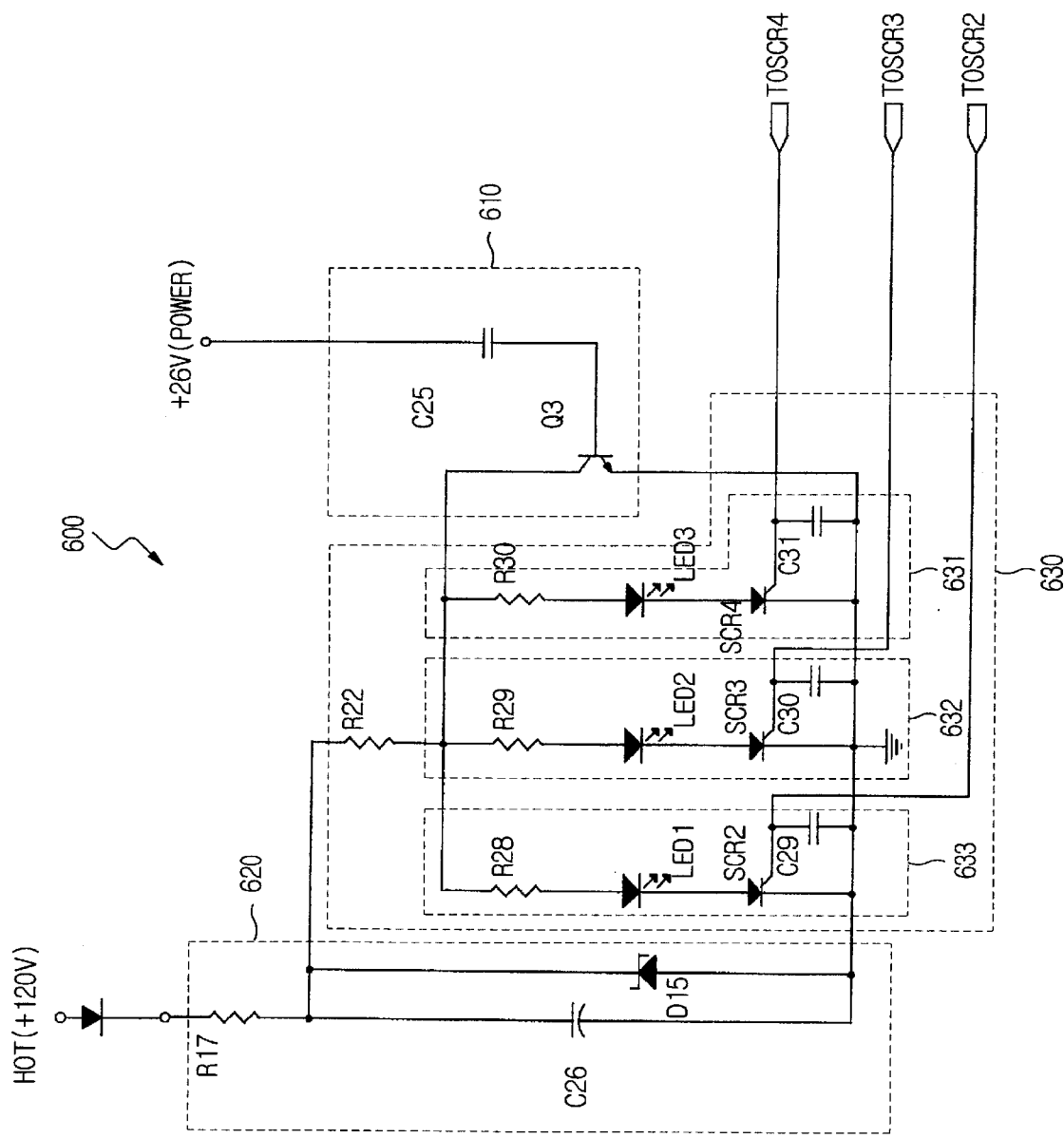
FIG. 24 is a schematic diagram illustrating the display panel 600 of the present invention in more detail.

A schematic diagram illustrating display panel 600 of the present invention in more detail is shown in FIG. 24. Arc fault display element 631 comprises serially connected resistor R30, light emitting diode LED3 and silicon controlled rectifier SCR4, and capacitor C31 coupled to gate of the SCR4. Also, ground fault display element 632 comprises resistor R29, LED2, SCR3 and capacitor C30 coupled to gate of the SCR3. Similarly, overload display element 633 comprises serially connected resistor R28, LED1 and SCR2, and capacitor C29. Display controller 610 receives power +26 volts, and comprises a capacitor C25 and bipolar junction transistor Q3, which controls on/off of light emitting diodes LED1, LED2, LED3. More in detail, in the off status of the circuit breaker, if the manager turns on the circuit breaker, display controller 610 turns off light emitting diodes LED1, LED2, LED3 instantaneously. Therefore, display panel 600 returns to its initial status automatically. Power supply 620 comprises resistor R17 connected to the phase wire HOT, capacitor C26 and diode D15 in parallel.

In conclusion, if an arc fault occurs, the arc fault display signal TOSCR2 of AFCI 300 turns on SCR2 in arc fault display element 631, and the light emitting diode LED1 displays the arc fault indication signal to the outside. Similarly, if a ground fault or overload occurs, ground fault display signal TOSCR3 or overload display signal TOSCR4 turns on the SCR3 or SCR4 respectively, and light emitting diode LED2 or LED3 displays the indication signal of ground fault or overload to the outside. Also, if the manager supplies power to the interrupted circuit breaker by fault, display panel 600 turns off due to transistor Q3.

As described above, the AFCI of the present invention can detect arc faults more effectively than was previously possible, and thus can prevent fires caused by such faults.

Also, the AFCI, and the circuit breaker with the same, use a single magnetic core and coil. Therefore they need fewer elements than the previous AFCI and circuit breaker, making them more economical to produce.

Also, the AFCI can control the trip level triggered by the arc fault.

As discussed previously, the AFCI can be used as a stand-alone arc fault detector or combined with other types of circuit interrupting devices. Therefore, the circuit breaker can be installed easily in commercial or residential applications where space is limited.

Also, the circuit breaker of the present invention has display elements for indication of an arc fault, ground fault or overload respectively. Thus, the manager can check for these faults easily.

Also, after the circuit breaker is interrupted and a display element is turned on, the circuit breaker can be restarted and the display panel turned off simultaneously.

While the present invention has been particularly shown and described with reference to preferred embodiments thereof, it will be appreciated that many variations, modifications and other applications of the present invention may be made.

What is claimed is:

1. An arc fault circuit interrupter (AFCI) in an electrical wiring system that can shut an AC (Alternating Current) source off from a phase conductor and a neutral conductor when an arc fault occurs in the AC source, said AFCI comprising:

a current transformer for producing an arc voltage in accordance with the variation of current in the phase conductor and in the neutral conductor;

an arc fault detector for limiting the arc voltage to a specified level and producing an arc fault indicative signal when the arc voltage is higher than a reference arc signal with predetermined level;

a trip signal generator which is capable of charging the arc fault indicative signal, and if the charged arc fault indicative signal corresponds to a reference trip level, then producing a trip signal; and a trip circuitry coupled to the phase conductor and the neutral conductor, for shutting the AC source off from the phase conductor and the neutral conductor in response to the trip signal wherein said arc fault detector comprises:

a filter for diminishing a harmonic frequency (i.e., overtone) component from the arc voltage and limiting the arc voltage to a specified level; and a comparator for comparing the limited arc voltage with the reference arc signal and producing the arc fault indicative signal when the limited arc voltage is larger than the reference arc signal;

wherein said filter comprises:
a level limiter for limiting the arc voltage to the specified level; and
a rectifier for half or full wave rectifying the limited arc voltage;

wherein said rectifier comprises:
a first plurality of diodes coupled between the resistor of said level limiter and ground; and
a second plurality of diodes coupled between the resistor of said level limiter and said comparator.

2. The AFCI as in claim 1, wherein said comparator comprises at least one operational amplifier.

3. The AFCI as in claim 1, wherein said comparator comprises a reference arc signal generator.

4. An arc fault circuit interrupter (AFCI) in an electrical wiring system that can shut an AC (Alternating Current) source off from a phase conductor and a neutral conductor when an arc fault occurs in the AC source, said AFCI comprising:

a current transformer for producing an arc voltage in accordance with the variation of current in the phase conductor and in the neutral conductor;
an arc fault detector for limiting the arc voltage to a specified level and producing an arc fault indicative signal when the arc voltage is higher than a reference arc signal with predetermined level;
a trip signal generator which is capable of charging the arc fault indicative signal, and if the charged arc fault indicative signal corresponds to a reference trip level, then producing a trip signal; and
a trip circuitry coupled to the phase conductor and the neutral conductor, for shutting the AC source off from the phase conductor and the neutral conductor in response to the trip signal;

wherein said trip signal generator comprises:
a voltage divider for dividing the arc fault indicative signal;
a comparator for comparing the divided arc fault indicative signal with the reference trip level and providing a first state output signal when the divided arc fault indicative signal is higher than the reference trip level;
a first switch for controlling electrical power being provided to the comparator; and
a trip level controller for providing the trip signal according to the first state output signal.

5. The AFCI as in claim 4, wherein said first switch comprises a common emitter amplifier.

6. The AFCI as in claim 4, wherein said trip level controller comprises a resistor coupled to output terminal of said comparator and a capacitor in parallel with the resistor.

7. The AFCI as in claim 6, wherein said resistor is a variable resistor.

8. The AFCI as in claim 4 further comprises a second switch coupled between said comparator and said trip level controller, for transferring the first state output signal to said trip level controller.

9. The AFCI as in claim 8, wherein said second switch comprises an emitter follower.

10. A circuit breaker in an electrical wiring system that can shut an AC (Alternating Current) source off from a phase conductor and a neutral conductor when at least one of an arc fault, ground fault or overload occurs in the AC source, said circuit breaker comprising:

an arc fault circuit interrupter (AFCI) coupled to the phase conductor and the neutral conductor for detecting an arc fault and producing an arc fault trip signal comprising:
a current transformer for producing an arc voltage in accordance with variation of current in the phase conductor and the neutral conductor;
an arc fault detector for limiting the arc voltage to a specified level and producing an arc fault indicative signal when the arc voltage is higher than a reference arc signal with predetermined level; and
a trip signal generator which is capable of charging the arc fault indicative signal, and if the charged arc fault indicative signal corresponds to a reference trip level, then producing the arc fault trip signal;
a ground fault circuit interrupter (GFCI) coupled to the phase conductor and the neutral conductor for detecting ground fault and producing a ground fault trip signal;
an overload circuit interrupter (OLCI) coupled to the phase conductor and the neutral conductor for detecting an overload and producing an overload trip signal;
a display circuitry for indicating the arc fault, ground fault or overload respectively corresponding with at least one selected from the group consisting of the arc fault trip signal, the ground fault trip signal and the overload trip signal; and
a trip circuitry coupled to the phase conductor and the neutral conductor, for shutting the AC source off from the phase conductor and the neutral conductor corresponding with at least one selected from the group consisting of the arc fault trip signal, the ground fault trip signal and the overload trip signal;

wherein said trip circuitry comprises:
a power interrupter for shutting the AC source off from the phase conductor and the neutral conductor if an arc fault, the ground fault or overload occurs; and
a trip controller for controlling said power interrupter corresponding with at least one selected from the group consisting of the arc fault trip signal, the ground fault trip signal and the overload trip signal;

wherein said trip controller comprises:
a silicon controlled rectifier (SCR);
at least one diode for directing path of the current flow in said trip circuitry in accordance with generation of the magnetic pulse; and
a pressure controller.

11. The circuit breaker as in claim 10, wherein said pressure controller comprises:

a first node coupled to the at least one diode of the trip controller and the varistor;

a second node coupled to the phase wire; and a third node coupled to the first node, wherein, the first node is connected to the second node or third node in accordance with an operation of said switch circuit.

12. The circuit breaker as in claim 10, wherein said display circuitry comprises:
- a plurality of display elements for indicating at least one selected from the group consisting of the arc fault, the ground fault and the overload;
- a display controller for controlling the operation of said display elements; and
- a power supply for providing power to said display elements.

13. The circuit breaker as in claim 12, wherein said display elements comprise at least one light emitting diode.

14. The circuit breaker as in claim 12, wherein said display controller comprises a switching device connected between both ends of said display elements, wherein operation of the switching device is controlled by on/off of the circuit breaker.

* * * * *